(12) United States Patent
Kato

(10) Patent No.: US 7,145,681 B2
(45) Date of Patent: Dec. 5, 2006

(54) APPARATUS AND METHOD FOR PROCESSING DIVIDED IMAGE DATA

(75) Inventor: Katsunori Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 765 days.

(21) Appl. No.: 10/320,383

(22) Filed: Dec. 17, 2002

(65) Prior Publication Data

US 2003/0123085 A1 Jul. 3, 2003

(30) Foreign Application Priority Data

Dec. 27, 2001 (JP) ............................ 2001-396726
Sep. 26, 2002 (JP) ............................ 2002-281376

(51) Int. Cl.
*G06F 3/12* (2006.01)
(52) U.S. Cl. ..................................... 358/1.15
(58) Field of Classification Search ............... None
See application file for complete search history.

(56) References Cited

U.S. PATENT DOCUMENTS 6,633,685 B1  10/2003  Kusama et al. ............ 382/284
6,804,018 B1*  10/2004  Mochizuki ................. 358/1.14
2001/0033392 A1  10/2001  Utsunomiya ............... 358/1.15
2002/0060806 A1*  5/2002  Gassho et al. ............. 358/1.15

FOREIGN PATENT DOCUMENTS

JP    8-328786    12/1996
JP    2002-8002 A    1/2002

* cited by examiner

*Primary Examiner*—Mark Zimmerman
*Assistant Examiner*—Jacob P. Rohwer
(74) *Attorney, Agent, or Firm*—Fitzpatrick, Cella, Harper & Scinto

(57) ABSTRACT

The present invention relates to an image processing apparatus and method for processing an original image in units smaller (typically) than the original image (e.g., tiles). In a case where image data based on such divided image data input from an input source is transferred to an external device, then if the external device which has to process the original image, interrupts processing, the input divided image data is sequentially discarded, unit by unit.

4 Claims, 18 Drawing Sheets

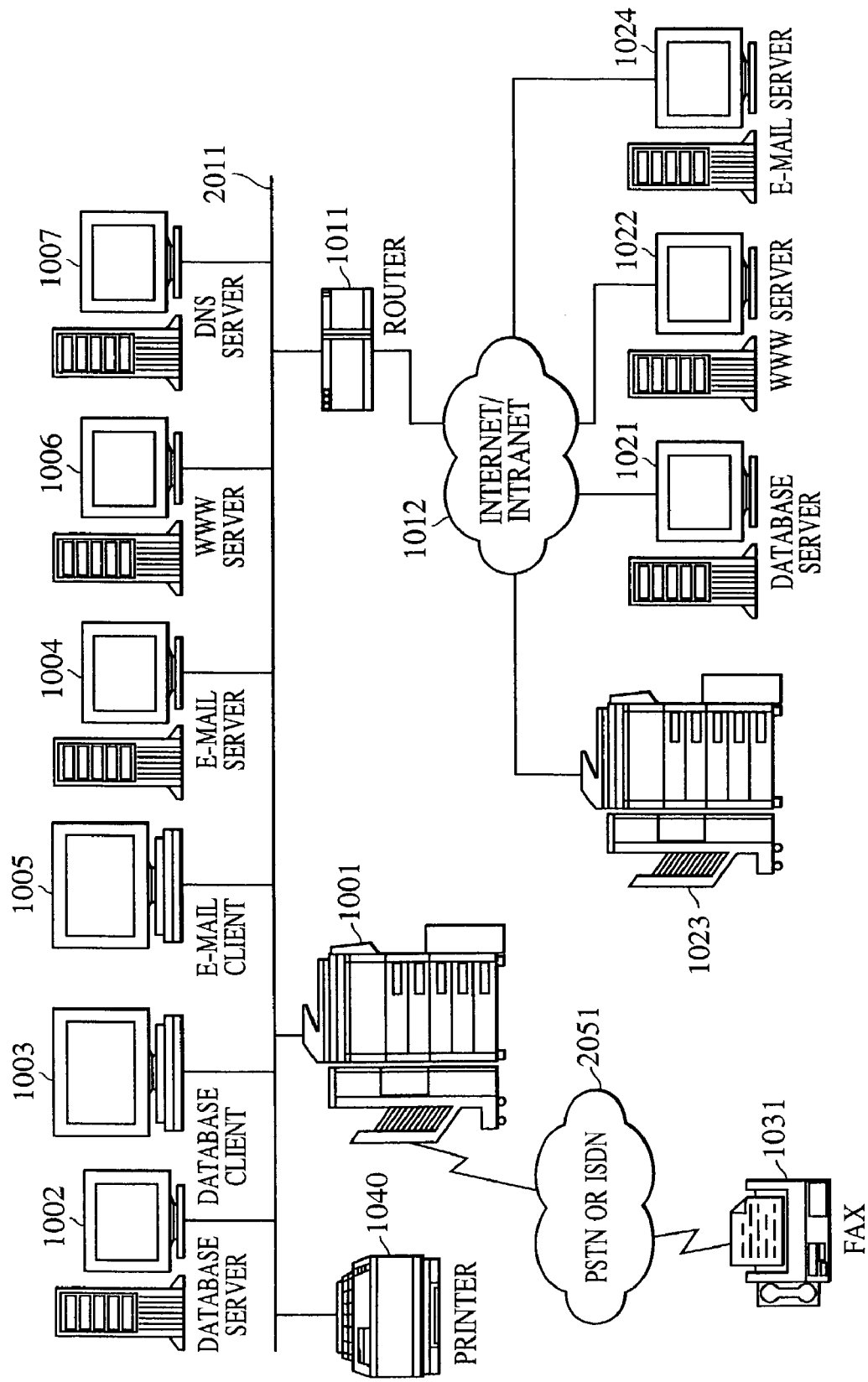

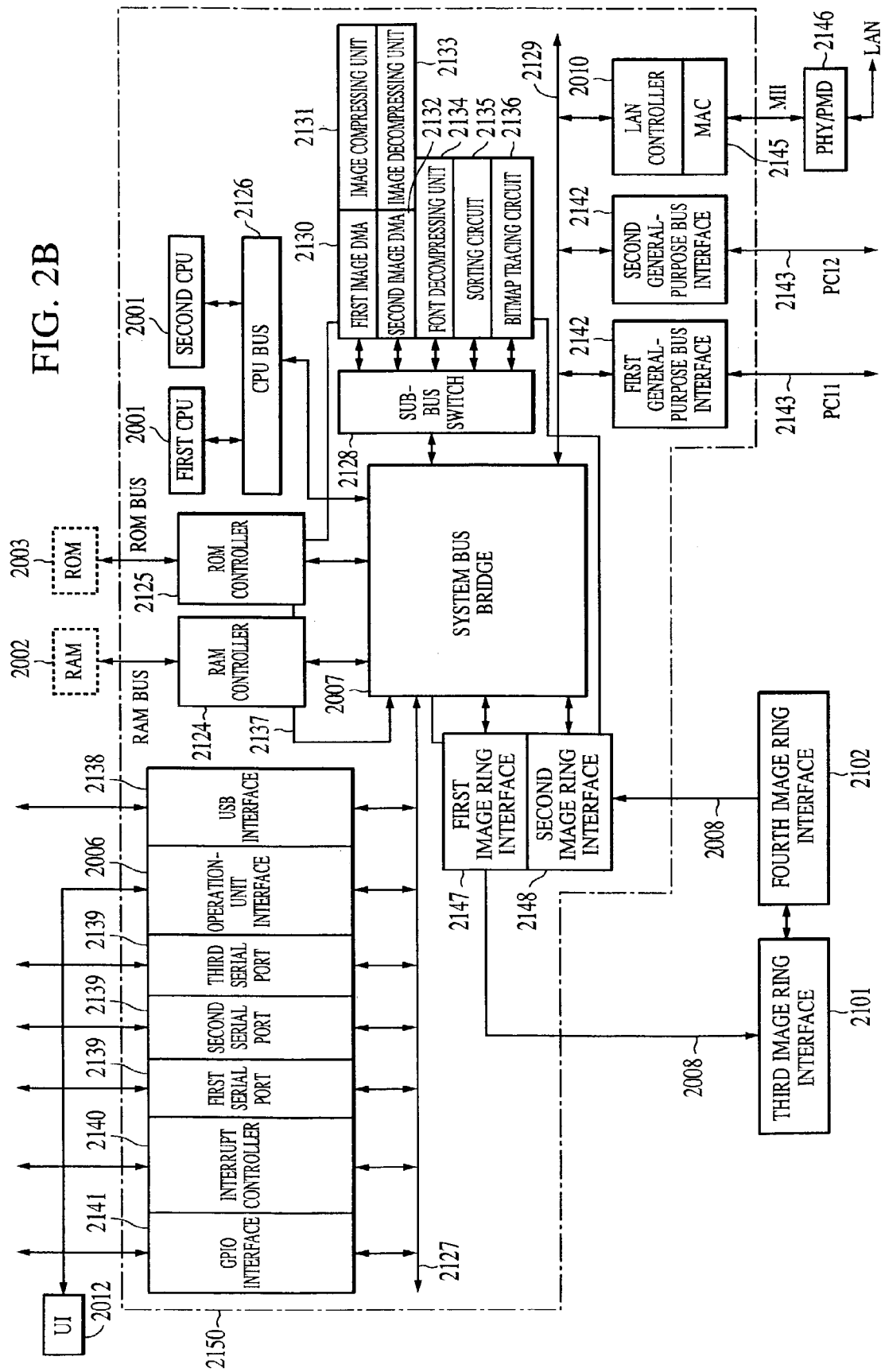

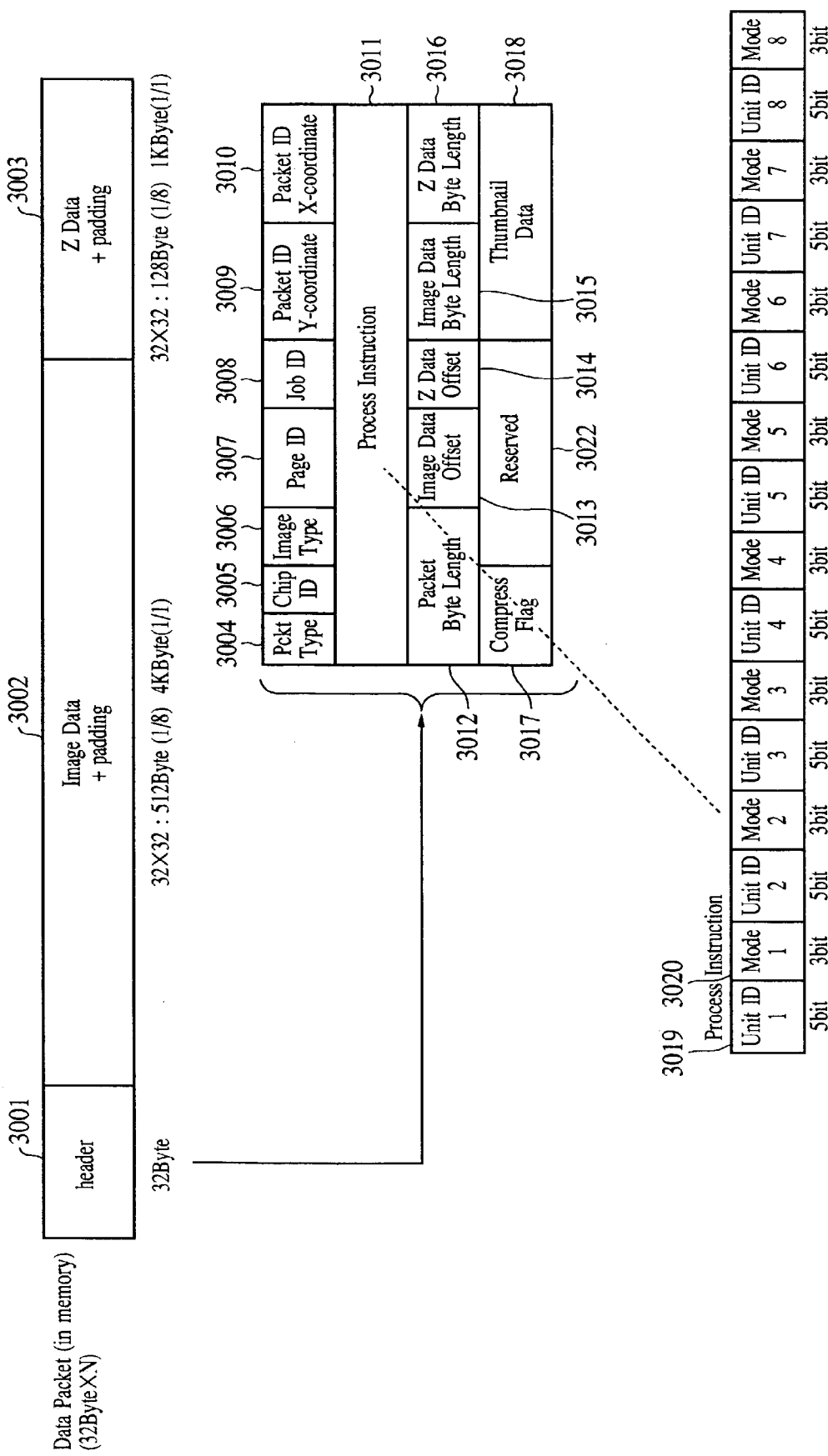

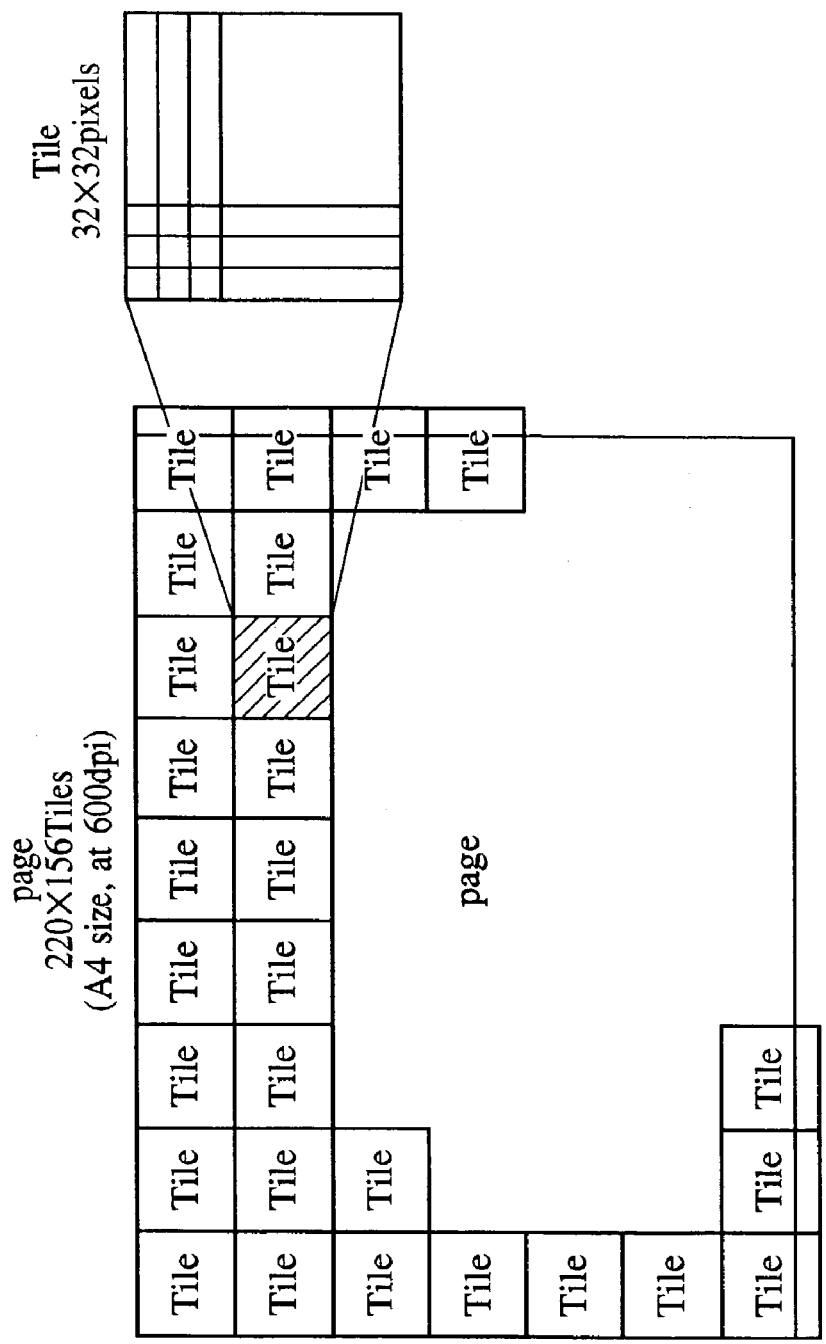

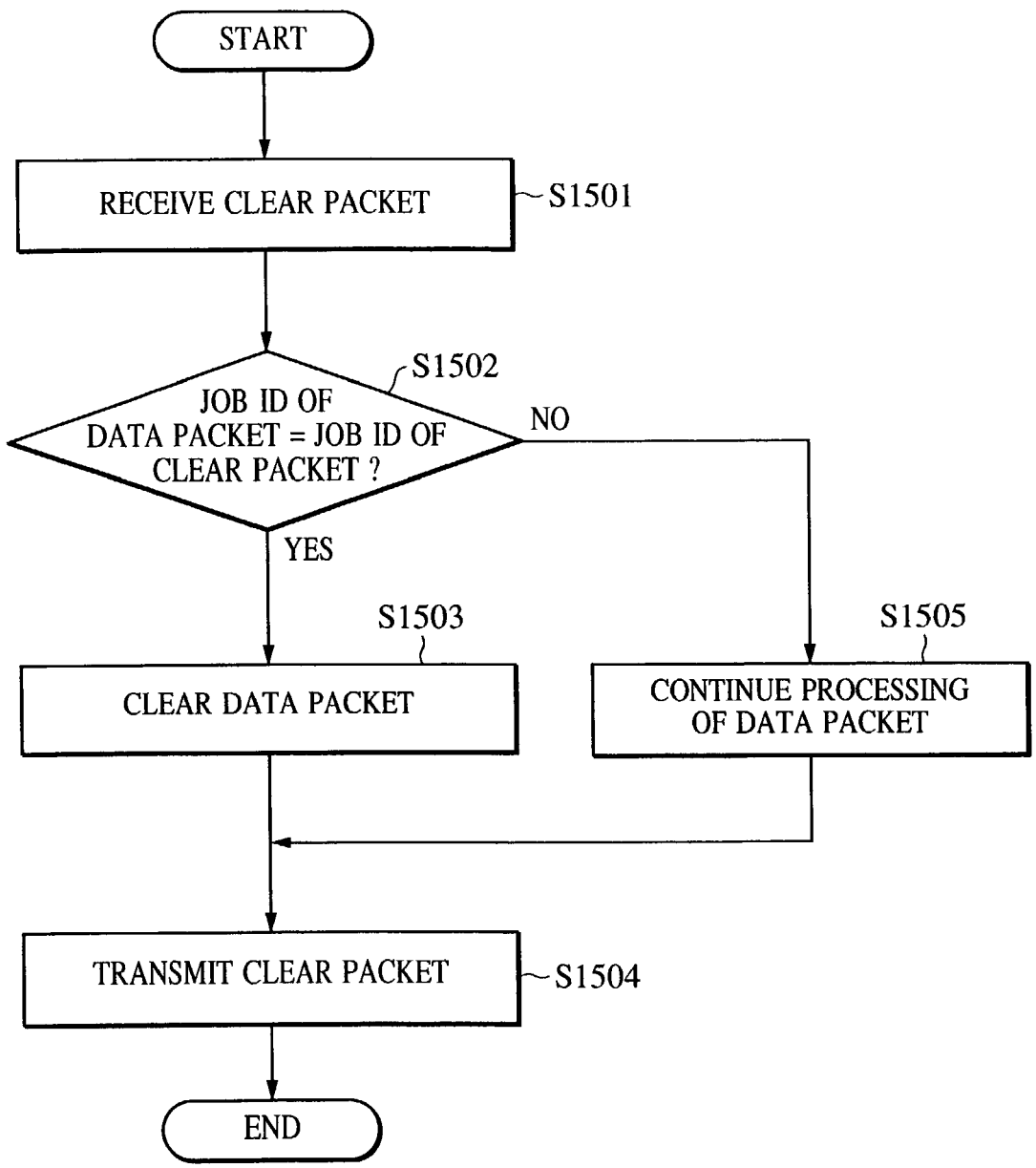

APPARATUS AND METHOD FOR PROCESSING DIVIDED IMAGE DATA

BACKGROUND OF THE INVENTION

1. Field of the Invention

The present invention relates to an image processing apparatus and method for processing a predetermined original image in units of divided image data (by which is meant that the image data representing the image is divided into two or more portions, which are processed as units).

2. Description of the Related Art

Hitherto, when image data input using an image scanner is printed by an image output device such as a printer or a digital multifunction machine, the input image data is temporarily developed into raster type image data in an image memory of one page capacity. The raster type image data is then printed by the image output device.

Developing high-quality image data including data of four bytes per pixel in a raster manner in an A4 sized page (297 mm×210 mm) at a resolution of 600 dpi requires an enormous memory capacity, of about 140 M bytes. Requiring a large-capacity memory results in an increase in the cost of the device.

In recent years, techniques of dividing each page of image data into blocks, each having a predetermined size, and then performing image processing in units of divided image data, have been proposed in Japanese Patent Application Laid-Open No. 2002-008002 and the like. According to the technique using divided image data, image processing and storage processing capable of handling an entire page at once are not needed. The above-mentioned disadvantage of high cost can be sidestepped, resulting in an increase in image processing efficiency.

However, disadvantageously, when image data is handled as divided image data, in some cases, data management or image processing may be complicated. For example, when an image output device is interrupted due to a paper jam, the operation of recovering from the interrupt state may be complicated.

SUMMARY OF THE INVENTION

The present invention is made to overcome the above disadvantages. It is one feature of the present invention to provide an image processing apparatus and method in which recovery from an interrupt state can be easily controlled without complicated processing in a path through which divided image data is transferred.

According to the present invention, this feature is implemented by providing an image processing apparatus for processing an image to be processed by an external device in units of divided image data, including transfer control means for performing a control so that image data based on the divided image data input from a predetermined input source is transferred to the external device, and detecting means for detecting a state of the external device. When the detecting means detects that the external device is interrupting or has interrupted processing, the transfer control means performs a control so that the input divided image data is sequentially discarded.

Another feature of the present invention is to provide an image processing apparatus and method such that recovery from an interrupt state can be easily controlled without complicated processing in sections for processing divided image data.

According to the present invention, the latter feature is provided in an image processing apparatus for processing an image to be processed by an external device in units of divided image data, including instructing means for instructing image processing of the divided image data input from a predetermined input source, image processing means for performing image processing on the divided image data on the basis of an instruction from the instructing means, and detecting means for detecting a state of the external device. When the detecting means detects that the external device is interrupting or has interrupted processing, the instructing means transmits interrupt information regarding the image processing to the image processing means, and the image processing means clears the divided image data on the basis of the received interrupt information.

Still another feature of the present invention is to provide an image processing apparatus and method such that recovery from an interrupt state and continuing image processing can be easily controlled during concurrent processing.

According to the present invention, this third feature is attained by providing an image processing apparatus for processing a predetermined original image in units of divided image data, including image processing means for assigning a first transfer path to first image processing and assigning a second transfer path to second image processing to perform concurrent processing of the first image processing and the second image processing. The apparatus also has detecting means for detecting a state in which the image processing should be interrupted, and when the detecting means detects a state in which the second image processing should be interrupted, the image processing means sequentially discards divided image data with which the second image processing is concerned in the second transfer path, which does not overlap the first transfer path.

Yet another feature of the present invention is to provide an image processing apparatus and method such that interrupting processing of a data packet which satisfies a predetermined condition, and recovery from an interrupt state can be easily controlled.

According to the present invention, this fourth feature is attained by providing an image processing apparatus for processing a data packet comprising divided image data of an original image and attribute information, including instructing means for instructing image processing of the data packet, and image processing means for performing the image processing of the data packet on the basis of an instruction from the instructing means. When image processing of a data packet which satisfies a predetermined condition is interrupted, the instructing means transmits interrupt information including the condition to the image processing means, and the image processing means clears a data packet on the basis of the attribute information and the received interrupt information.

Further objects, features and advantages of the present invention will become apparent from the following description of the preferred embodiments with reference to the attached drawings.

BRIEF DESCRIPTION OF THE DRAWINGS

FIG. 1 is a block diagram showing an example of the configuration of a network in a case where an image output device to which the present invention is applied is used while connected to the network.

FIGS. 2A to 2C are block diagrams showing an example of the configuration of an image output device using an image processing apparatus according to a first embodiment of the present invention.

FIGS. 3A and 3B are diagrams showing the format of a data packet which is used in a controller of the image processing apparatus in FIG. 2A.

FIG. 15 is a flowchart explaining the detail of processing of a first tile decompressing unit 2103 according to a fourth embodiment of the present invention.

DESCRIPTION OF THE PREFERRED EMBODIMENTS

Figure 2A:
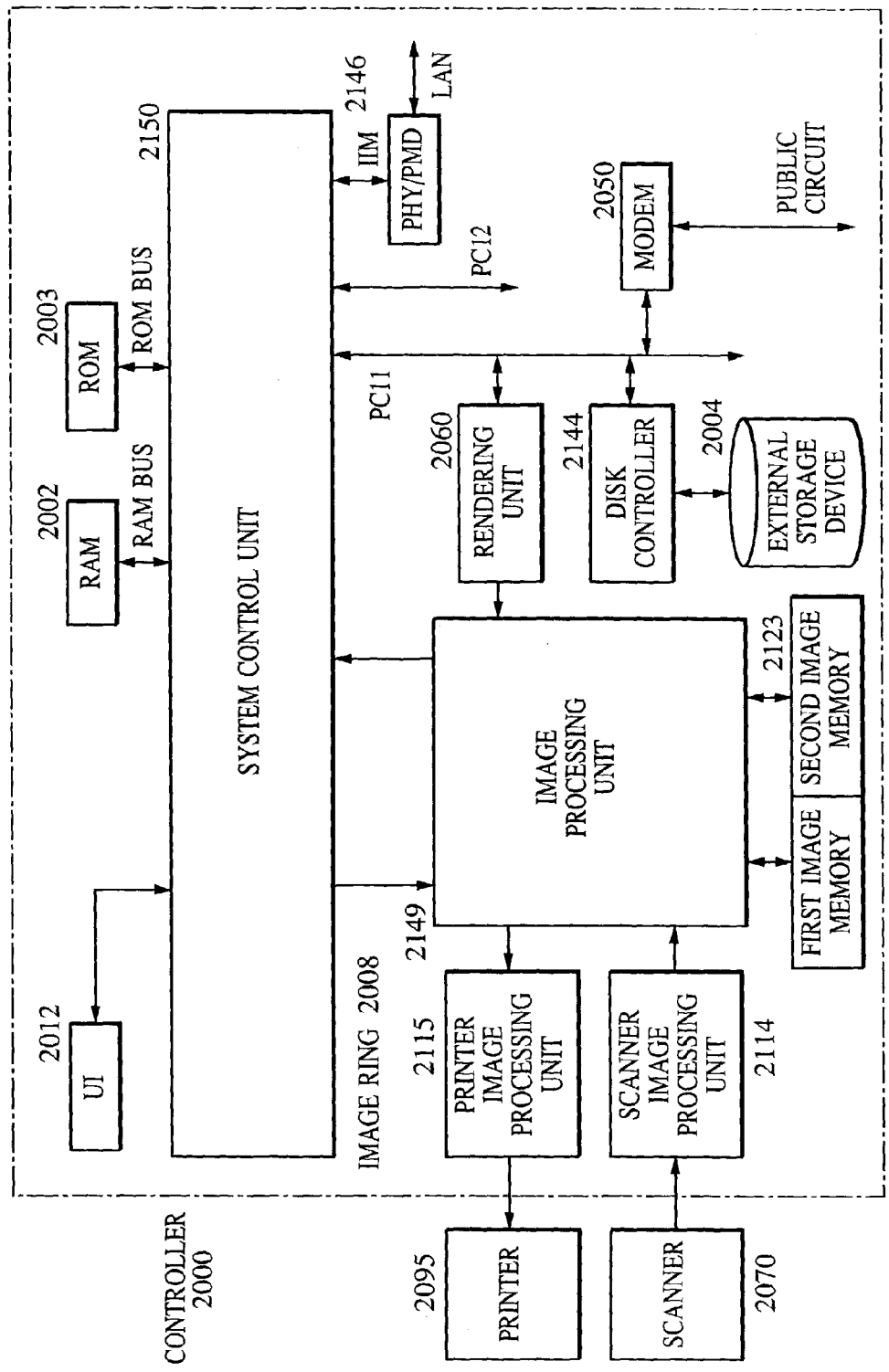

The preferred embodiments of the present invention will now be described, with reference to the drawings.

First Embodiment

Configuration of Network

FIG. 1 is a block diagram showing an example of the configuration of a network in a case where a digital multifunction machine according to the present invention is used while connected to the network.

Referring to FIG. 1, network components are connected to a LAN (local area network) 2011. Among them, reference numeral 1001 denotes a digital multifunction machine to which the present invention can be applied. The digital multifunction machine 1001 has a scanner unit for reading an image and a printer unit for printing the image.

The digital multifunction machine 1001 can output an image read through the scanner unit to the LAN 2011 or print out an image transmitted from the LAN 2011 through the printer unit. The digital multifunction machine 1001 can also transmit an image read through the scanner unit to a PSTN (public switched telephone network) or an ISDN (integrated services digital network) 2051 using fax transmitting means (not shown) or print out an image transmitted from the PSTN or ISDN 2051 through the printer unit.

A database server 1002 functions as a database and manages a binary image or a multi-level image read by the digital multifunction machine 1001. A client 1003 of the database server 1002 browses and searches image data stored in the database server 1002.

An electric-mail server 1004 has a function of transmitting and receiving electric mails and a function of serving as a mail box. A client 1005 of the e-mail server 1004 can transmit and receive e-mails through the e-mail server 1004. The e-mail server 1004 and the e-mail client 1005 can also transmit and receive images read by the digital multifunction machine 1001 as attached files in the e-mails.

A WWW server 1006 provides an HTML document to the LAN 2011. The HTML document provided by the WWW server 1006 can be printed out by the digital multifunction machine 1001.

A DNS (domain name service) server 1007 for managing a domain name service and a printer 1040 are connected to the LAN 2011. The LAN 2011 is connected to the Internet or an intranet 1012 via a router 1011.

In some cases, devices similar to the above-mentioned network components, namely, a digital multifunction machine 1023, a database server 1021, a WWW server 1022, and an e-mail server 1024 are connected to the Internet/intranet 1012 as shown in FIG. 1.

The digital multifunction machine 1001 can communicate with a facsimile machine 1031 via the PSTN or ISDN 2051.

Configuration of Digital Multifunction Machine

Figure 2C:
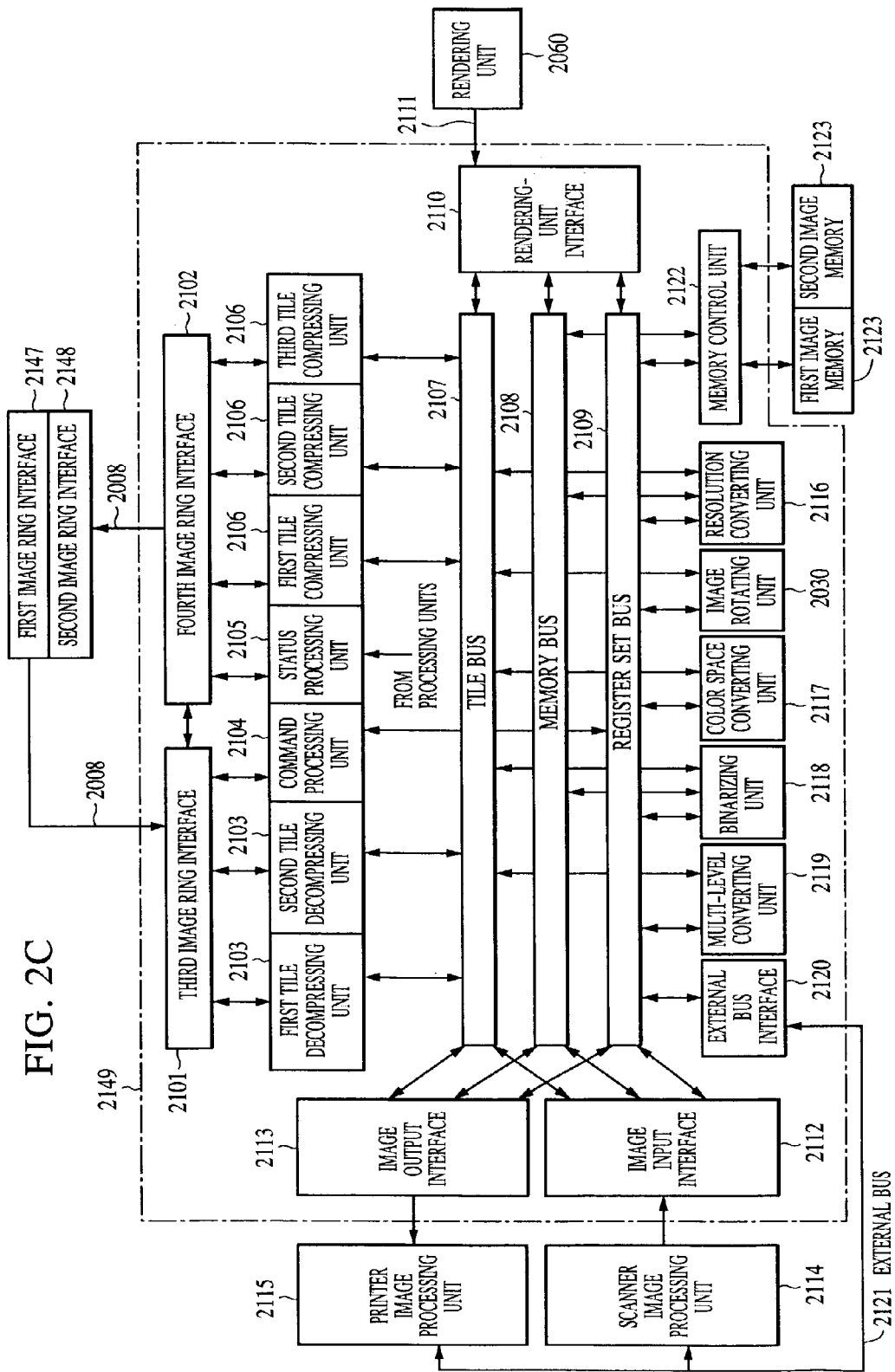

FIGS. 2A to 2C are block diagrams showing an example of the configuration of the digital multifunction machine according to the present invention. According to a first embodiment, a case where the present invention is applied to a controller of the digital multifunction machine will be described. The present invention can also be applied to an image processing apparatus having another, arbitrary configuration.

Referring to FIG. 2A, in the digital multifunction machine, a controller 2000 having an image processing unit 2149 is connected to a scanner 2070, serving as an image input device, and a printer 2095, serving as an image output device. The controller 2000 transmits data to and receives data from an external device via the LAN 2011 and the public circuit (WAN: wide area network) 2051 to input and output images. As will be described later, the controller 2000 can process an image to be processed by the external device such as the printer 2095, an external storage device 2004, or any device connected to the network in FIG. 1, in units of tile images (data packets).

Referring to FIG. 2B, a system control unit 2150 includes CPUs 2001 and controls the entire digital multifunction machine. According to the present embodiment, two CPUs are used. The two CPUs are connected to a system bus bridge 2007 through a common CPU bus 2126.

The system bus bridge 2007 functions as a first bus switch. The CPU bus 2126, a RAM controller 2124, a ROM controller 2125, a first IO (input/output) bus 2127, a sub-bus switch 2128, a second IO bus 2129, a first image ring interface 2147, and a second image ring interface 2148 are connected to the system bus bridge 2007.

The sub-bus switch 2128 functions as a second bus switch. A first image DMA (direct memory access) 2130, a second image DMA 2132, a font decompressing unit 2134, a sorting circuit 2135, and a bitmap tracing circuit 2136 are connected to the sub-bus switch 2128. The sub-bus switch 2128 arbitrates between memory access requests generated from those DMAs and connects each DMA, as appropriate, to the system bus bridge 2007.

A RAM 2002 is a system work memory for the operation of the CPUs 2001 and also functions as an image memory for temporarily storing image data. The RAM controller 2124 controls the RAM 2002. According to the present embodiment, for example, a direct RDRAM (Rambus dynamic random access memory) is used as the RAM 2002.

A ROM 2003 is a boot ROM in which a boot program for the system has been stored. The ROM controller 2125 controls the ROM 2003.

The first image DMA 2130 is connected to an image compressing unit 2131. On the basis of information set via a register access ring 2137, the first image DMA 2130 permits the image compressing unit 2131 to read out uncompressed data from the RAM 2002, compress the data, and rewrite the compressed data in memory. According to the present embodiment, for example, JPEG ("Joint Photographic Experts Group") compression is used as a compression algorithm.

The second image DMA 2132 is connected to an image decompressing unit 2133. On the basis of information set via the register access ring 2137, the second image DMA 2132 permits the image decompressing unit 2133 to read out compressed data from the RAM 2002, decompress the data, and rewrite the decompressed data in memory. According to the present embodiment, in accordance with the foregoing compression algorithm, JPEG compression is used as a decompression algorithm.

The font decompressing unit 2134 decompresses compressed font data stored in the ROM 2003 or RAM 2002 on the basis of a font code included in PDL ("page description language") data transferred from the outside via a LAN controller 2010 and other similar components. According to the present embodiment, for instance, an FBE algorithm is used.

The sorting circuit 2135 changes the sequence of objects of a display list formed when the PDL data is developed.

The bitmap tracing circuit 2136 extracts edge information from bitmap data.

The first IO bus 2127 is a kind of internal IO bus. A controller for USB ("universal serial bus") serving as a standard bus, a USB interface 2138, general purpose serial ports 2139, an interrupt controller 2140, and a GPIO ("general purpose input/output") interface 2141 are connected to the first IO bus 2127. The first IO bus 2127 includes a bus arbiter (not shown).

An operation-unit interface 2006 is connected to an operation unit such as a user interface ("UI") 2012. The operation-unit interface 2006 outputs image data to be displayed on the operation unit 2012 to the operation unit 2012. The operation-unit interface 2006 also transmits information input from the operation unit 2012 by the user to the CPUs 2001.

The second IO bus 2129 also is a kind of internal IO bus. First and second general purpose bus interfaces 2142 and the LAN controller 2010 are connected to the second IO bus 2129. The second IO bus 2129 includes a bus arbiter (not shown).

The general purpose bus interfaces 2142 shown are two of the same kind of bus interface. Each interface serves as a bus bridge for supporting a standard IO bus. According to the present embodiment, a PCI ("peripheral component interconnect") bus 2143 is used as the standard IO bus.

Referring to FIG. 2A, the external storage device 2004 functions as a hard disk drive (HDD) and stores system software and image data. The external storage device 2004 is connected to one of the PCI buses 2143 via a disk controller 2144.

The LAN controller 2010 is connected to the LAN 2011 via a MAC ("medium access control") circuit 2145 and a PHY/PMD ("physical sub-layer/physical medium dependent") circuit 2146 to input and output information. A modem 2050 is connected to the public circuit 2051 to input and output information.

Referring to FIG. 2B, the first image ring interface 2147 and the second image ring interface 2148 each serve as an interface to be connected to an image ring 2008 through which image data is transferred at high speed. Each interface also functions as a DMA controller for transferring compressed image data between the RAM 2002 and the image processing unit 2149 (see FIGS. 2A and 2C).

The image ring 2008 is a bus comprising a pair of unidirectional connecting paths (first and second image rings). Referring to FIG. 2C, in the image processing unit 2149, the image ring 2008 is connected to a tile decompressing unit 2103, a command processing unit 2104, a status processing unit 2105, and a tile compressing unit 2106 through a third image ring interface 2101 and a fourth image ring interface 2102. According to the present embodiment, two tile decompressing units and three tile compressing units are provided.

The tile decompressing units 2103 are connected to the third image ring interface 2101 and are also connected to a tile bus 2107. Each tile decompressing unit 2103 functions as a bus bridge for decompressing compressed image data input from the image ring 2008 and then transferring the decompressed data to the tile bus 2107. According to the present embodiment, serving as the decompression algorithms, JPEG decompression is used for multi-level data, and Pack Bits decompression is used for binary data.

The tile compressing units 2106 are connected to the fourth image ring interface 2102 and are also connected to the tile bus 2107. Each tile compressing unit 2106 functions as a bus bridge for compressing image data, which is subject to compression, input from the tile bus 2107 and then transferring the compressed image data to the image ring 2008. According to the present embodiment, in accordance with the above decompression algorithms, serving as the compression algorithms, JPEG compression is used for multi-level data, and Pack Bits compression is used for binary data.

The command processing unit 2104 is connected to the third and fourth image ring interfaces 2101 and 2102 and is also connected to a register set bus 2109. The command processing unit 2104 writes a register set request, which is generated from at least one of the CPUs 2001 and is then input via the image ring 2008, in an appropriate block connected to the register set bus 2109. On the basis of a register read-out request generated by at least one of the CPUs 2001, the command processing unit 2140 reads out information from an appropriate register through the register set bus 2109 and then transfers the information to the fourth image ring interface 2102.

The status processing unit 2105 monitors information relating to image data processing units (namely, a multi-level converting unit 2119, a binarizing unit 2118, a color-space converting unit 2117, an image rotating unit 2030, and a resolution converting unit 2116, which will be described below). The status processing unit 2105 forms an interrupt packet to generate an interrupt to at least one of the CPUs 2001, and then the formed packet is sent to the fourth image ring interface 2102.

In addition to the above-mentioned blocks, the following functional blocks are connected to the tile bus 2107: a rendering-unit interface 2110, an image input interface 2112, an image output interface 2113, the multi-level converting unit 2119, the binarizing unit 2118, the color-space converting unit 2117, the image rotating unit 2030, and the resolution converting unit 2116 are connected to the tile bus 2107.

The rendering-unit interface 2110 inputs a bitmapped image formed by a rendering unit 2060, which will be described below. The rendering unit 2060 transmits or receives a general video signal 2111 via the rendering-unit interface 2110. The rendering-unit interface 2110 is connected to the tile bus 2107, a memory bus 2108, and the register set bus 2109. The rendering-unit interface 2110 converts an input raster image into tile images according to a predetermined method set through the register set bus 2109, synchronizes the tile images with clocks, and then outputs the tile images to the tile bus 2107.

The image input interface 2112 receives raster image data subjected to correction image processing by a scanner image processing unit 2114, converts the image data into tile images according to the predetermined method set through the register set bus 2109, synchronizes the tile images with clocks, and then outputs the tile images to the tile bus 2107.

The image output interface 2113 receives tile image data from the tile bus 2107, converts the data into a raster image, changes a clock rate, and then outputs the raster image to a printer image processing unit 2115. As will be described later, the image output interface 2113 transmits control information and status information to, and receives these types of information from, the printer 2095. Thus, the image output interface 2113 can detect interrupt information regarding the printer 2095 (for example, information indicating the occurrence of a paper jam or the like), on the basis of the received status information. The image output interface 2113 can discard tile image data while the processing of the printer 2095 is interrupted.

The image rotating unit 2030 rotates image data. The resolution converting unit 2116 changes the resolution of image data. The resolution converting unit 2116 also functions as a scaling unit. The color-space converting unit 2117 converts the color space of a color or grayscale image. The binarizing unit 2118 binarizes a multi-level (color or grayscale) image. The multi-level converting unit 2119 converts a binary image into multi-level data.

An external bus interface 2120 functions as a bus bridge for receiving write and read-out requests generated from the CPUs 2001 through the first, second, third, and fourth image ring interfaces 2147, 2148, 2101, and 2102, the command processing unit 2104, and the register set bus 2109, converting the requests, and then outputting the requests to an external bus 2121. According to the present embodiment, the external bus 2121 is connected to the printer image processing unit 2115 and the scanner image processing unit 2114.

A memory control unit 2122 is connected to the memory bus 2108. The memory control unit 2122 performs the operations of writing image data to, and reading it from, first and second image memories 2123, whose addresses have been divided, in accordance with requests of the respective image processing units 2116, 2117, 2118, 2119, and 2030 in the image processing unit 2149 and also performs the operation of refreshing the image memories 2123 as necessary. According to the present embodiment, for example, an SDRAM ("synchronous dynamic random access memory") is used as each image memory.

The scanner image processing unit 2114 performs predetermined correction image processing on image data scanned by the scanner 2070 serving as an image input device. The printer image processing unit 2115 performs predetermined correction image processing for image formation output and then outputs the result to the printer 2095.

The rendering unit 2060 develops a PDL code or an intermediate display list into a bitmapped image.

Configuration of Packet

The format of a packet which is used for image data processing according to the present embodiment will now be described. The controller 2000 according to the present embodiment transfers image data, commands generated by the CPUs 2001, and interrupt information generated by the respective image data processing units 2116, 2117, 2118, 2119, and 2030 in a packet form. The following kinds of packet data exist.

(1) Data Packet (FIGS. 3A and 3B)

Referring to FIG. 3A, a data packet is composed of image data 3002 in units of tiles, which are image data divided into sets of a predetermined number of pixels (32 pixels×32 pixels in the present embodiment), header information 3001 in which control information is stored, and image additional information 3003. The control information will be described below.

Referring to FIG. 3B, for example, an original document of one page is divided into a plurality of tiles, thereby forming tile data, tile by tile. It is assumed that an original document of the A4 size (210×297 mm) is read by the scanner 2070 at a resolution of 600×600 dpi. Since one inch equals 25.4 mm, the number of pixels of an image is equal to (4961 pixels in the longitudinal direction)×(7016 pixels in the lateral direction). When the image is divided using a tile composed of 32×32 pixels, 34,320 tile data are obtained from the original document of the A4 size.

Information included in the header information 3001 will now be described.

The type of packet is discriminated by information in a pckt-type field 3004 in the header information 3001. The pckt-type field 3004 includes a repeat flag. When the image data 3002 is identical with image data of a data packet transmitted just before the present data packet, the repeat flag is set.

A chip-ID field 3005 designates a packet transmission destination. An image-type field 3006 designates the type of image data. A page-ID field 3007 designates the page number of image data. A job-ID field 3008 stores a job ID to be used in management of image processing by software.

A packet-ID-Y-coordinate field 3009 and a packet-ID-X-coordinate field 3010 designate which tile the image data included in the packet (or "designated image data", hereinafter) corresponds to in the entire image. The position of a tile is shown by YnXn which is obtained by combining the Y coordinate (packet-ID-Y-coordinate field 3009) and the X coordinate (packet-ID-X-coordinate field 3010).

In a data packet, image data is compressed or not compressed. According to the present embodiment, for compression algorithms, JPEG compression is used for multi-level color (including multi-level and grayscale) data, and Pack Bits compression is used for binary data. A compress-flag field 3017 designates whether image data is compressed or not compressed.

A process-instruction field 3011 is composed of processing units Nos. 1 to 8 each of which has a combination of a unit-ID field 3019 of five bits and a mode field 3020 of three bits. The processing units are sequentially processed from the left (in ascending order). The processed unit-ID field and mode-field are discarded once they have been processed, and the whole of the process-instruction field 3011 is shifted to the left by eight bits so that the next unit-ID field and mode field to be processed are located at the leftmost position. For the combination of the unit-ID field 3019 and the mode field 3020, eight combinations are stored in the process-instruction field 3011 at the maximum. The unit-ID field 3019 designates an image data processing unit. The mode field 3020 designates operation mode in the image data processing unit. Consequently, it is possible to instruct consecutive processing for image data included in one image data packet (the "designated image data") using eight image data processing units at the maximum.

A packet-byte-length field 3012 designates the total number of bytes of the packet. An image-data-byte-length field 3015 denotes the number of bytes of image data. A Zdata-byte-length field 3016 designates the number of bytes of image additional information. An image-data-offset field 3013 designates the offset of the image data from the packet head. A Zdata-offset field 3014 designates the offset of the image additional information from the packet head.

Figure 4:
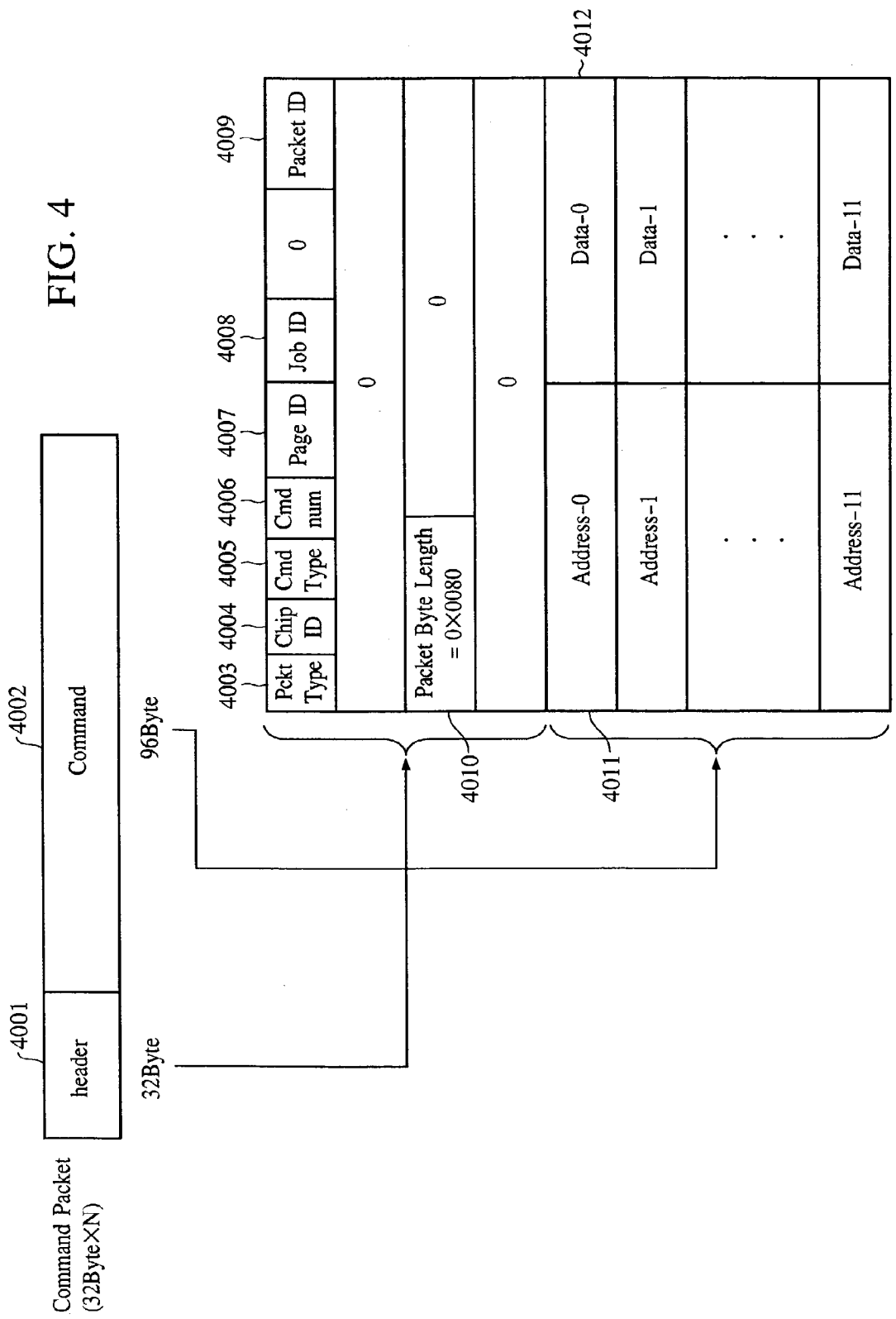
FIG. 4 is a diagram showing the format of a command packet which is used in the controller of the image processing apparatus in FIG. 2A.

(2) Command Packet (FIG. 4)

A command packet is set to access the register set bus 2109. Access from at least one of the CPUs 2001 to at least one of the image memories 2123 can also be accomplished using the command packet. The command packet is composed of a header 4001 and a command (packet data portion) 4002.

The ID specifying the image processing unit 2149 serving as a command-packet transmission destination is stored in a chip-ID field 4004 in the header 4001.

A page-ID field 4007 and a job-ID field 4008 store a page ID and a job ID to be managed by software, respectively. An ID stored in a packet-ID field 4009 is expressed one-dimensionally and is expressed using only the X coordinate of a data packet. A packet-byte-length field 4010 is fixed to 128 bytes.

One command is composed of an address 4011 and data 4012. 12 commands at the maximum can be stored in the packet data portion 4002. A cmd-type field 4005 designates the type of command, namely, whether it is a write command or a read command. A cmd-num field 4006 designates the number of commands.

Figure 5:
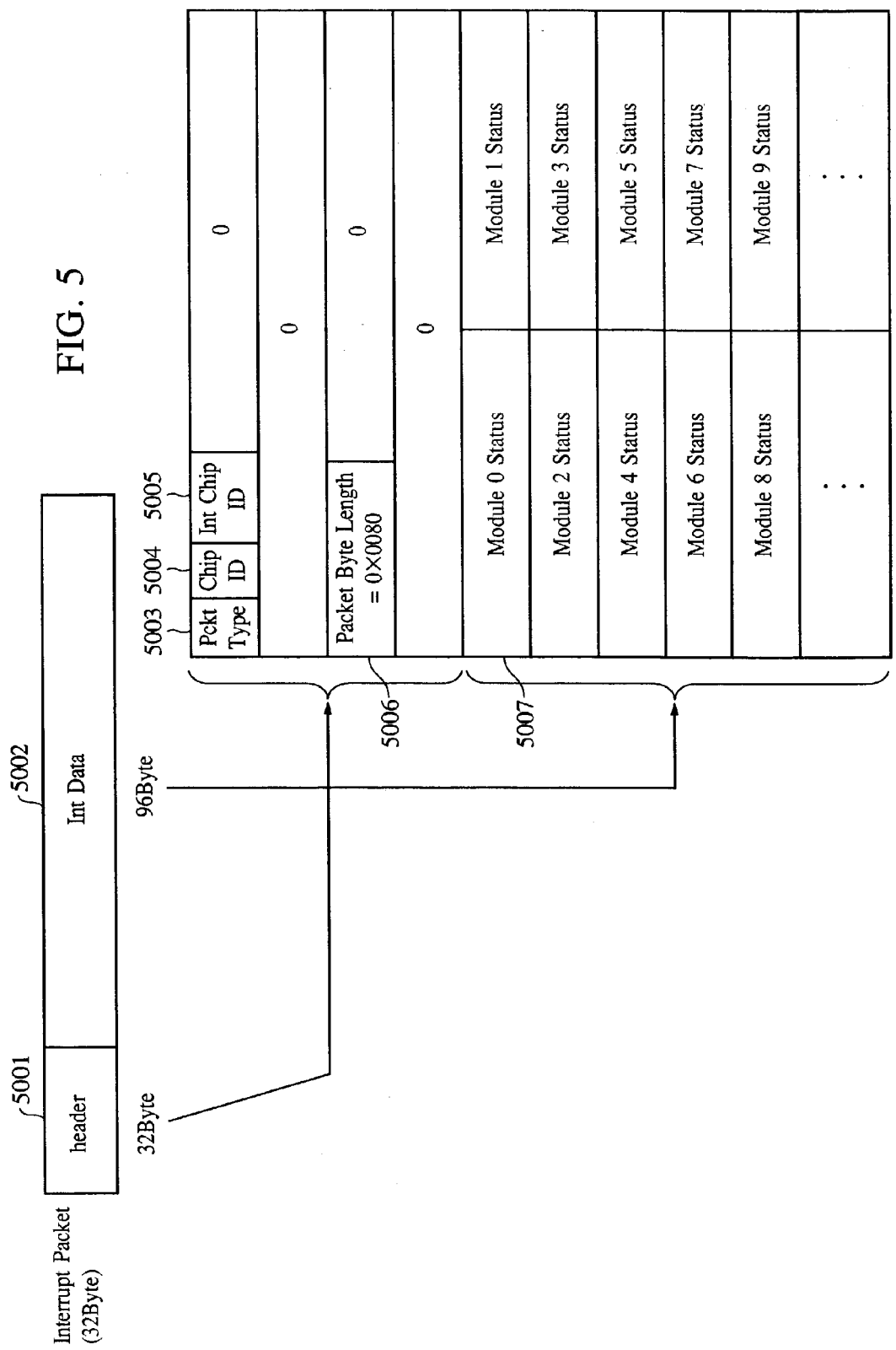
FIG. 5 is a diagram showing the format of an interrupt packet which is used in the controller of the image processing apparatus in FIG. 2A.

(3) Interrupt Packet (FIG. 5)

An interrupt packet is composed of a header 5001 and interrupt data (packet data portion) 5002. The interrupt packet is used to notify at least one of the CPUs 2001 of interrupt by the image processing unit 2149.

After the status processing unit 2105 transmits an interrupt packet, the unit 2105 is forbidden from transmitting an interrupt packet until transmission of the next interrupt packet is permitted. A packet-byte-length field 5006 is fixed to 128 bytes.

Status information 5007 of each internal module in the image processing unit 2149 is stored in the packet data portion 5002. The status processing unit 2105 can gather status information of the respective modules in the image processing unit 2149 and then transmit the information to the system control unit 2150 at one time.

The ID specifying the system control unit 2150 serving as an interrupt-packet transmission destination is stored in a chip-ID field 5004. The ID specifying the image processing unit 2149 serving as the interrupt-packet transmission destination is stored in an int-chip-ID field 5005.

Configuration of Packet Table

Figure 6:
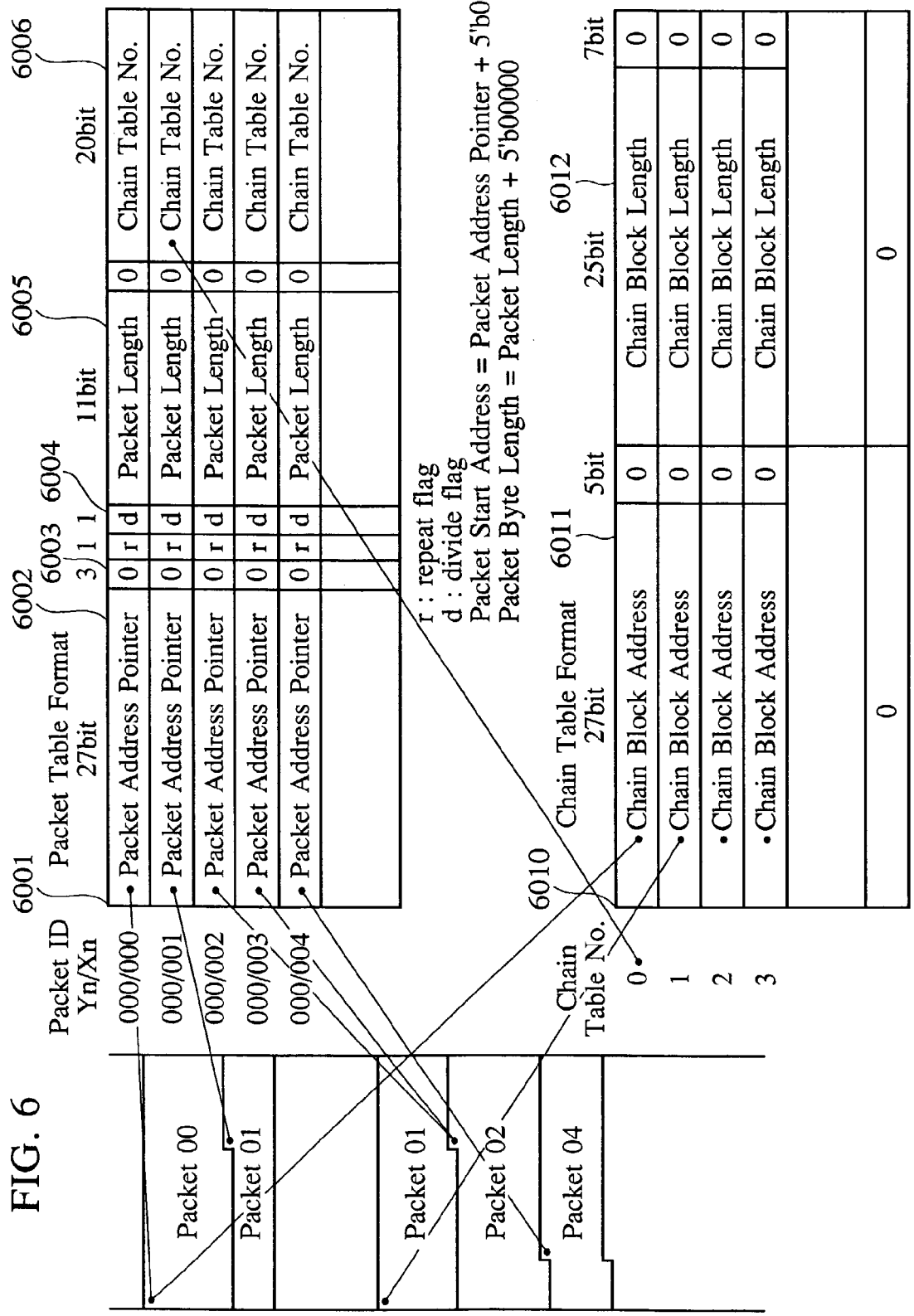
FIG. 6 is a diagram showing the format of a packet table which is used in the controller of the image processing apparatus in FIG. 2A.

The above-mentioned packets are managed in a packet table 6001 as shown in FIG. 6. The packet table and image data are used as a pair. When the corresponding image data is developed in the RAM 2002 in FIGS. 2A and 2B, the image data is managed in the RAM 2002. When the image data is stored in the external storage device 2004, simultaneously, the packet table 6001 is also stored in the external storage device 2004. When the image data stored in the external storage device 2004 is again developed in the RAM 2002, simultaneously, the packet table 6001 is also read out and address information is rewritten in accordance with address information specifying an address in which the image data is developed.

When a string of five bits, each of which is a zero, is added to each value in the table, a packet start address (in a packet-start-address field 6002) and the byte length of the packet (in a packet-byte-length field 6005) are obtained. In other words, a packet-address-pointer field (27 bits)+5b000000=the packet-start-address field, and a packet-length field (11 bits)+5b00000=the packet-byte-length field.

It is assumed that the packet table 6001 and a chain table 6010 are not separated.

The packet tables 6001 are always arranged in the scan direction in the order that Yn/Xn=000/000, 000/001, 000/002, . . . An entry of the packet table 6001 uniquely denotes one tile. The next entry of Yn/Ymax denotes Yn+1/X0.

When data of the present packet is identical with data of the preceding packet, the present packet is not written in a memory and the same information in the packet-address-pointer field and the packet-length field as those of the preceding packet are stored as an entry in the packet table. That is, two table entries denote one packet of data. In this case, a repeat flag 6003 is set in the second table entry.

When a packet is divided into a plurality of segments by a chain DMA, a divide flag 6004 is set, and chain table number 6006 of a chain block in which the packet start portion is located is set.

The entry of the chain table 6010 is composed of a chain-block-address field 6011 and a chain-block-length field 6012. Zero is stored in the last entry of each of the chain-block-address field 6011 and the chain-block-length field 6012 in the table.

Image Input Operation

The following image input operation will now be described. In the operation, image data read by the scanner 2070 is divided into tile images, a data packet is formed from each tile image, and each data packet is then stored in the RAM 2002.

Figure 7:
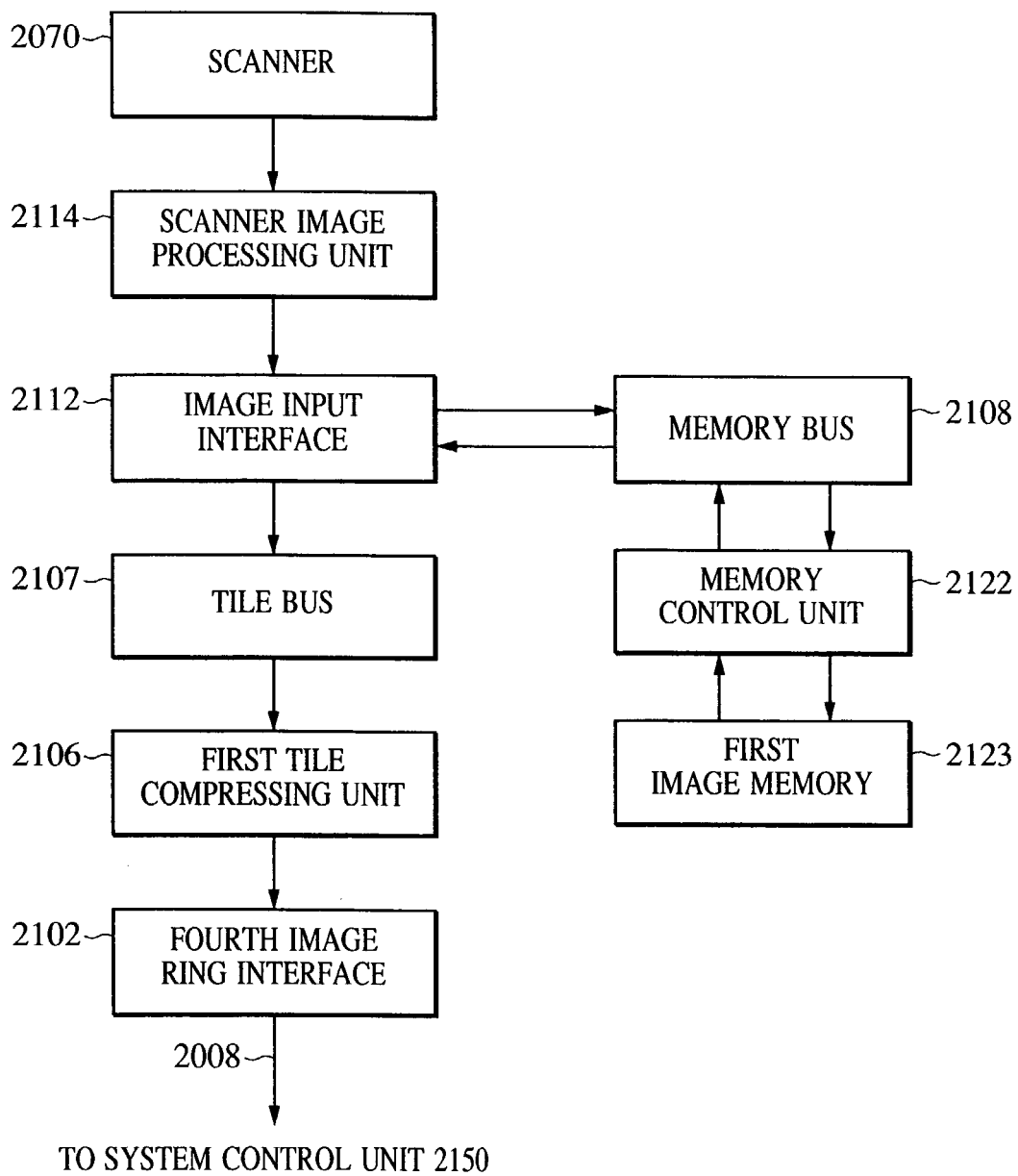
FIG. 7 is a diagram showing a data path between blocks in an image input process according to first and second embodiments of the present invention.

FIG. 7 is a diagram showing a data transfer path between the blocks concerned with the image input operation and a procedure. An explanation will be made with reference to FIG. 7 as appropriate in addition to the block diagrams of FIGS. 2A to 2C.

First, the scanner 2070 reads out an image. Read image data is sequentially transferred serving as raster data to the scanner image processing unit 2114. The scanner image processing unit 2114 performs necessary image processing on the transferred data in the order of raster data and then transfers the processed image data to the image input interface 2112. The image input interface 2112 transfers the image data transferred in the raster order to the memory control unit 2122 via the memory bus 2108.

The memory control unit 2122 develops the image data in the raster format in the first image memory 2123. The first image memory 2123 has a minimum capacity of 32 lines of raster data. When image data of 32 lines is developed in the first image memory 2123, the image input interface 2112 starts to read the raster data in the unit of tile images of 32 pixels×32 lines. The tile images are read through the memory control unit 2122 and the memory bus 2108.

The image input interface 2112 adds a header 3001 and Z data 3003 to the formed tile image 3002 to form a data packet in the format shown in FIG. 3A. Path information to store the image data in the RAM 2002 is recorded in the process-instruction field 3011. The path information is instructed using a command packet from the system control unit 2150. The path information has been stored in the image input interface 2112.

Subsequently, the image input interface 2112 requests the tile bus 2107 to make a connection to the first tile compressing unit 2106. When connected to the first tile compressing unit 2106 through the tile bus 2107, the image input interface 2112 transfers the data packets to the first tile compressing unit 2106.

The first tile compressing unit 2106 JPEG-compresses the data packets. The JPEG-compressed data packets are transferred to the fourth image ring interface 2102. The fourth image ring interface 2102 transfers the data packets to the system control unit 2150 through the image ring 2008. The system control unit 2150 stores the transferred data packets in the RAM 2002.

As mentioned above, the data packets are formed from the image read by the scanner 2070, are compressed, and are then stored in the RAM 2002 of the system control unit 2150.

Image Output Operation

The following image output operation will now be described. In the operation, an image is printed using the printer 2095 on the basis of the data packets stored in the RAM 2002 of the system control unit 2150.

Figure 8:
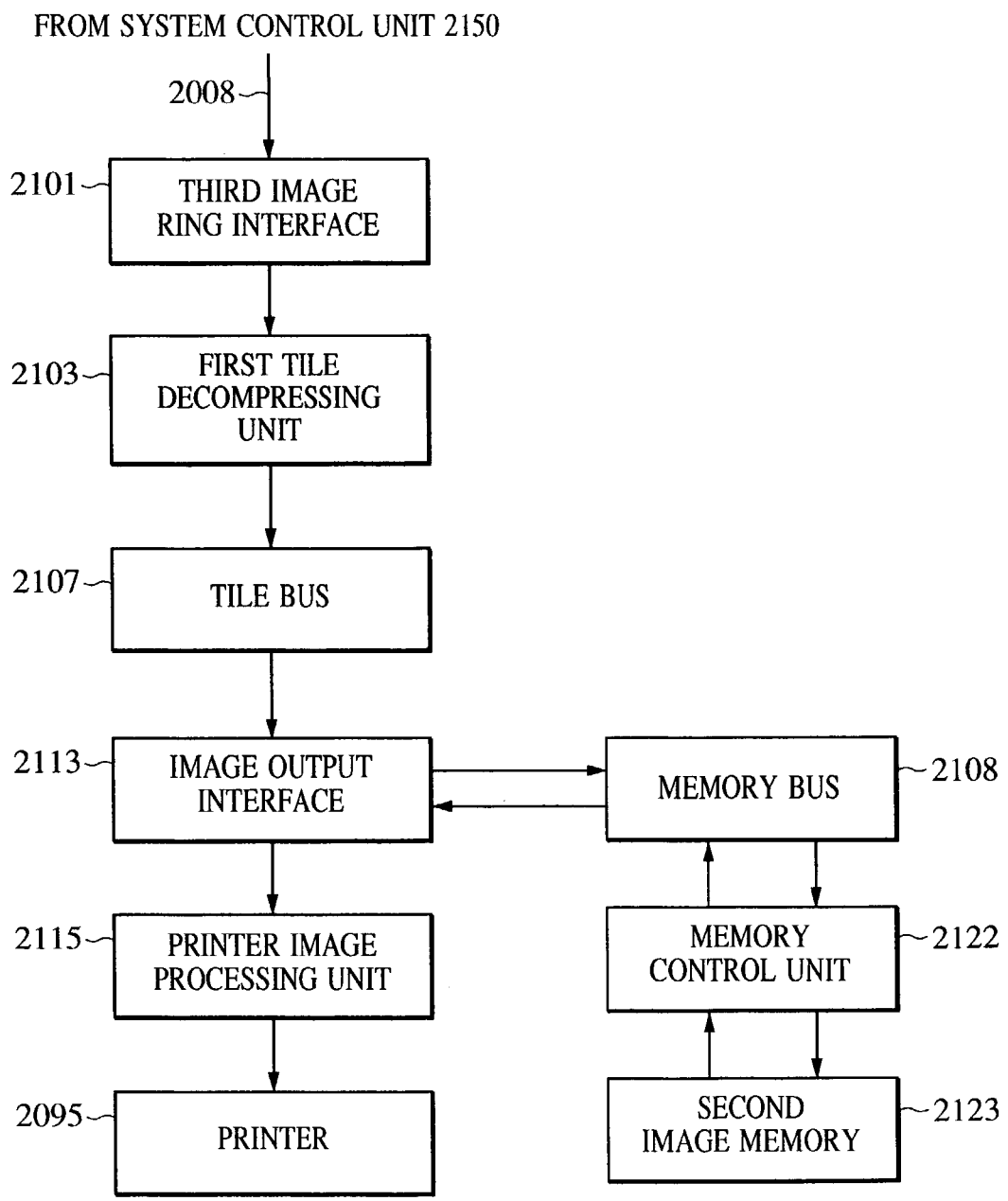
FIG. 8 is a diagram showing a data path between blocks in an image output process according to the first embodiment of the present invention.

FIG. 8 shows a data transfer path between the blocks concerned with the image output operation and a procedure. An explanation will be made with reference to FIG. 8 as appropriate in addition to the block diagrams of FIGS. 2A to 2C.

First, the data packets output from the system control unit 2150 are input to the third image ring interface 2101 through the image ring 2008. In the process-instruction field 3011, path information to output image data in the RAM 2002 through the printer 2095 is written by the system control unit 2150.

The third image ring interface 2101 selects the first tile decompressing unit 2103 and then transfers the data packets thereto. (The first tile decompressing unit 2103 is selected in accordance with the information in the process-instruction field 3011 in the foregoing packet format.)

The first tile decompressing unit 2103 JPEG-decompresses the tile image of each data packet to convert the compressed image data into uncompressed image data. Subsequently, the first tile decompressing unit 2103 requests the tile bus 2107 to make a connection to the image output interface 2113. When connected to the image output interface 2113 through the tile bus 2107, the first tile decompressing unit 2103 transfers the data packets to the image output interface 2113.

When receiving the data packets, the image output interface 2113 transfers the tile images of the data packets to the memory control unit 2122 through the memory bus 2108.

The memory control unit 2122 develops the transferred tile images in the second image memory 2123. The development is performed in units of tiles. In the second image memory 2123, each tile image is developed into raster data.

When all of the raster data of 32 lines to be output by the printer 2095 is developed, the image output interface 2113 starts to read the data in the raster order. The raster data is read through the memory control unit 2122 and the memory bus 2108. After reading the data in the raster order, the image output interface 2113 transfers the read data to the printer image processing unit 2115. When receiving the raster data, the printer 2095 prints an image on the basis of the raster data.

Multifunctional Operation of Digital Multifunction Machine

According to the digital multifunction machine of the present embodiment, the image input operation and the image output operation are combined, so that the copying operation using the scanner 2070 and the printer 2095 can be accomplished.

When the data packets in the RAM 2002 are stored in the external storage device 2004 after the image input operation, the operation of filing the image can be performed.

Each of the data packets in the RAM 2002 is again developed into raster data, the raster data is converted into data in a predetermined format, and the converted data is output to the LAN or public circuit. Thus, the image transmitting operation (such as the facsimile transmitting operation or mail transmission) based on a predetermined protocol can be performed.

In the above image output operation, when tile images are input from the rendering unit 2060 for performing the rendering process on the basis of PDL data supplied from an external device, the PDL printing operation can be performed.

The image processing operation of processing the data packets in the RAM 2002 through the image processing unit 2149 and, after that, re-storing the processed data packets to the RAM 2002 can also be performed. The image processing operation using the processing path can also be combined with at least one of the above operations as necessary, and the combined operation can be executed.

The main operations which can be executed in the digital multifunction machine according to the present embodiment have been described. During the operation, since image processing is performed using the data packets, the processing blocks in the image processing unit 2149 are ensured in the unit of tiles. Accordingly, image data concerned with a plurality of operations can be mixed in the image processing unit 2149. Control information for image processing is included in the header of each of various packets. After the packet is formed, each CPU 2001 hardly needs to control or manage image processing in the image processing unit 2149. In the digital multifunction machine with the above configuration according to the present embodiment, when a plurality of operations are concurrently executed, concurrent image processing concerned with the respective operations can be executed.

Operation in Paper Jamming

The operation in a case where a paper jam occurs in the printer 2095 will now be described.

When a paper jam occurs in the printer 2095, the printer 2095 cannot receive image data which is transferred after the paper jamming. Consequently, in the transfer path in the printing operation shown in FIG. 8, a plurality of data packets are accumulated. Simultaneously, a DMA started for print in the system control unit 2150 is interrupted.

In this state, in order to eliminate the paper jam in the printer 2095 and re-start the printing operation, it is necessary to clear all of the image tile data accumulated in the path. It is also necessary to interrupt the DMA in the system control unit 2150 and re-start the DMA.

According to the present embodiment, the digital multi-function machine is provided with a mechanism capable of executing the recovery operation after paper jamming without the above complicated control.

According to the present embodiment, the image output interface 2113 of the controller has a mechanism for detecting the state of the printer 2095 when a paper jam occurs in the printer 2095. After detecting a paper jam, the image output interface 2113 immediately discards data packets transferred after the detection, without transferring the data packets to the printer image processing unit 2115.

The image output interface 2113 sequentially discards data packets transferred thereafter and then receives all of the data packets for forming the image.

Figure 9:
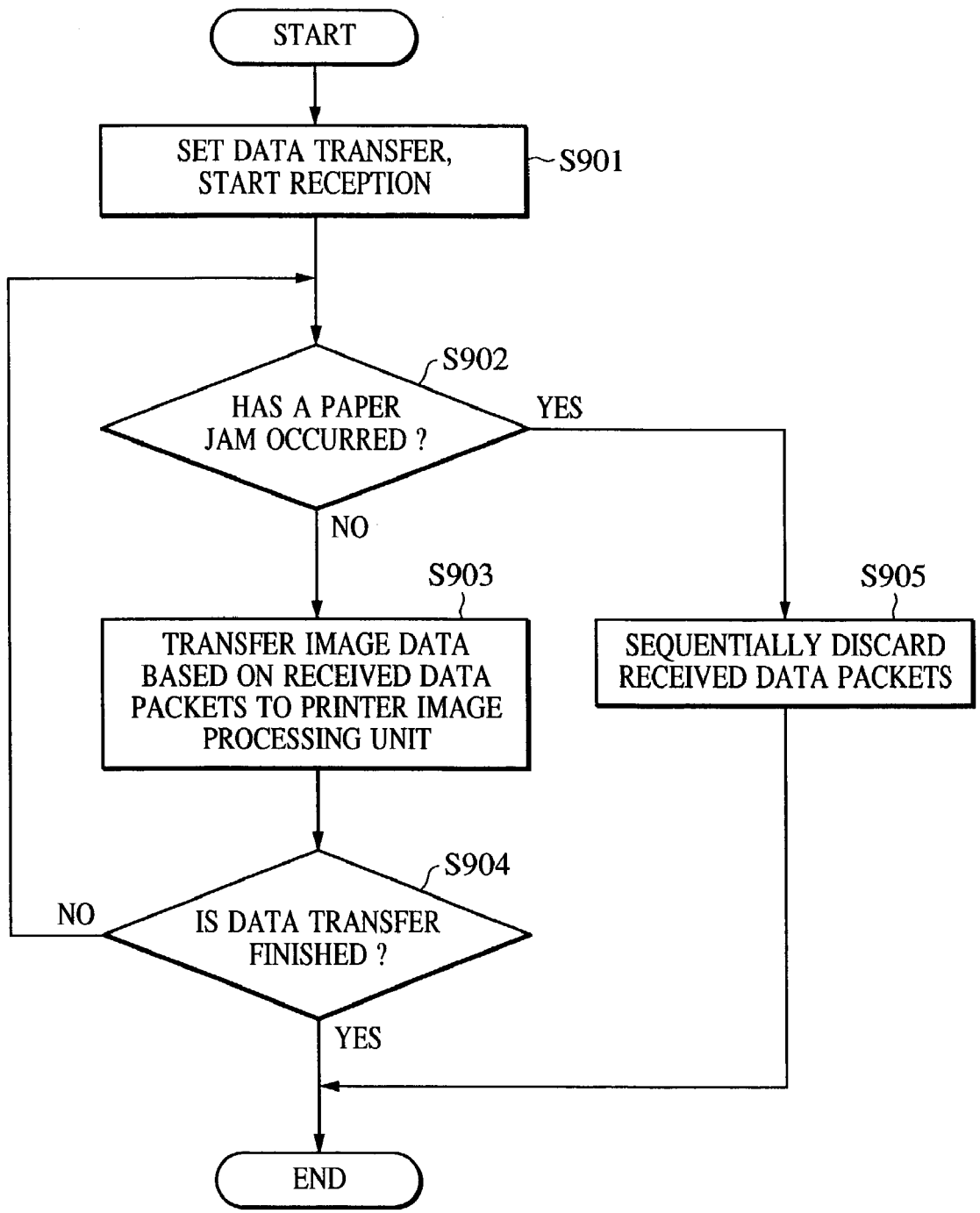
FIG. 9 is a flowchart showing a data transfer control in an image output interface.

FIG. 9 is a flowchart showing data transfer control in the image output interface 2113. An internal CPU (not shown) in the image output interface 2113 executes a control program stored in an internal memory (not shown) to accomplish the process of the present flowchart.

First, the transfer of image data in the RAM 2002 to the printer 2095 is set in accordance with an instruction transmitted from at least one of the CPUs 2001 through the register set bus 2109. After that, the reception of data packets transferred from the RAM 2002 is started (S901).

After the data transfer is started, the state of the printer 2095 is monitored with respect to occurrence of a paper jam. Operating state information is transmitted from the printer 2095 at predetermined time intervals. It is determined on the basis of this information whether a paper jam has occurred in the printer 2095 (S902).

If NO in step S902, the normal data transfer control is executed. In other words, a tile image is extracted from each received data packet, a plurality of tile images are developed into raster data in the second image memory 2123, and formed bitmap data is sequentially output to the printer image processing unit 2115 (S903).

It is determined whether the transfer of all data set to be transferred in step S901 is finished (S904). If NO, the process returns to step S902, and the data transfer is continuously performed. If YES, the data transfer control in the normal operation is finished.

If YES in step S902, a control to sequentially discard received data packets is performed (S905). The control is continued until all of data set in step S901 is received. When all the data set in step S901 is received and is then discarded, the data transfer control in paper jamming is finished.

Due to the above operation, if a paper jam occurs in the printer 2095 and the image output operation is interrupted, each of the circuits in the path to the image output interface 2113 performs the operation similar to the normal operation.

A DMA in the system control unit 2150 can be finished in the normal operation. When the DMA is finished in normal fashion, the system control unit 2150 determines whether a paper jam has occurred in the printer 2095. If a paper jam occurs, the system control unit 2150 performs the operation of again outputting the corresponding image.

Figure 10:
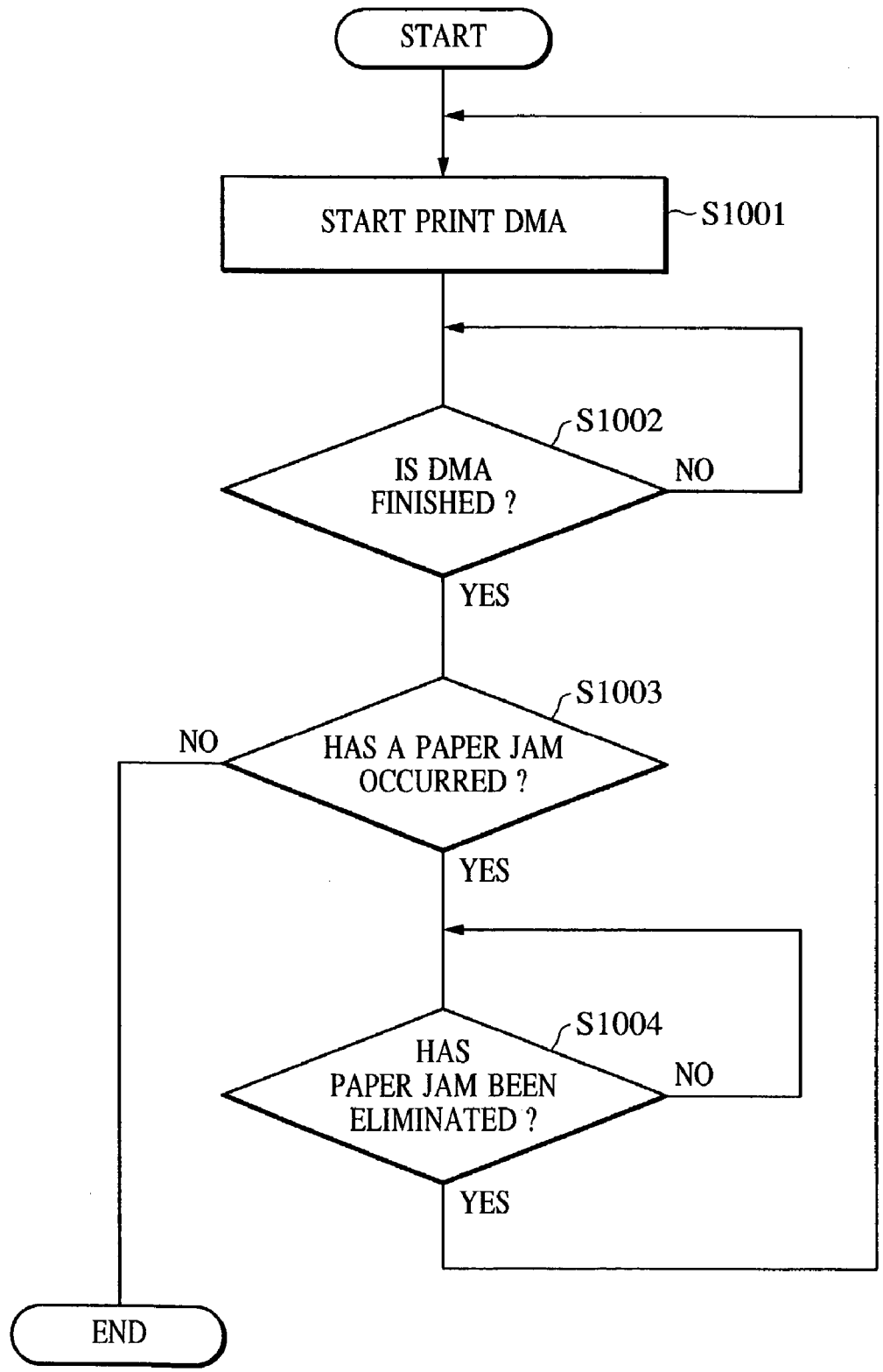
FIG. 10 is a flowchart explaining the operation when a paper jam occurs in the first embodiment of the present invention.

FIG. 10 is a flowchart showing a control for the printing operation, the control being performed by the CPUs 2001 in the system control unit 2150. This control will now be described using the flowchart.

First, a DMA for image print is started (S1001). In this instance, data packets used in the operation of FIG. 8 are transferred from the system control unit 2150 to the image processing unit 2149.

Whether the start of the print DMA is finished is determined (S1002). In other words, it is determined whether the transfer of the data packets to the image processing unit 2149 is finished. At this time, in the image processing unit 2149, image processing of the data packets is performed and the data is transferred to the printer 2095.

If YES in step S1002, whether a paper jam has occurred is determined (S1003). If YES, the process proceeds to step S1004.

In step S1004, whether the paper jam has been eliminated in the printer 2095 is determined. If YES, the process returns to step S1001 and the reprinting operation is started.

On the other hand, if NO in step S1003, the image printing operation is normally finished. According to the present embodiment, reprinting can be performed after paper jamming with the above-mentioned simple control.

As mentioned above, according to the present embodiment, if a paper jam occurs in the printer and it is detected that printout has been interrupted, the image output interface controls the data transfer so as to receive packet data transferred on the basis of DMA and then sequentially discard the received packet data.

Accordingly, operation similar to normal operation can be performed in the transfer path from the system control unit to the printer. Thus, recovery from paper jamming can be easily controlled.

Second Embodiment

The configuration for easily performing the recovery operation in the data transfer path has been described in the first embodiment. In some cases, the initializing of each of the components in the data transfer path may be required. According to a second embodiment, a configuration for easily performing the initializing of each data processing unit after paper jamming will now be described.

Image Output Operation

According to the present embodiment, the following image output operation will now be described. In the operation, an image is printed using the printer 2095 on the basis of data packets stored in the RAM 2002 of the system control unit 2150. According to the present embodiment, image print is output so that an image is rotated by 90 degrees with respect to the corresponding original image.

Figure 11:
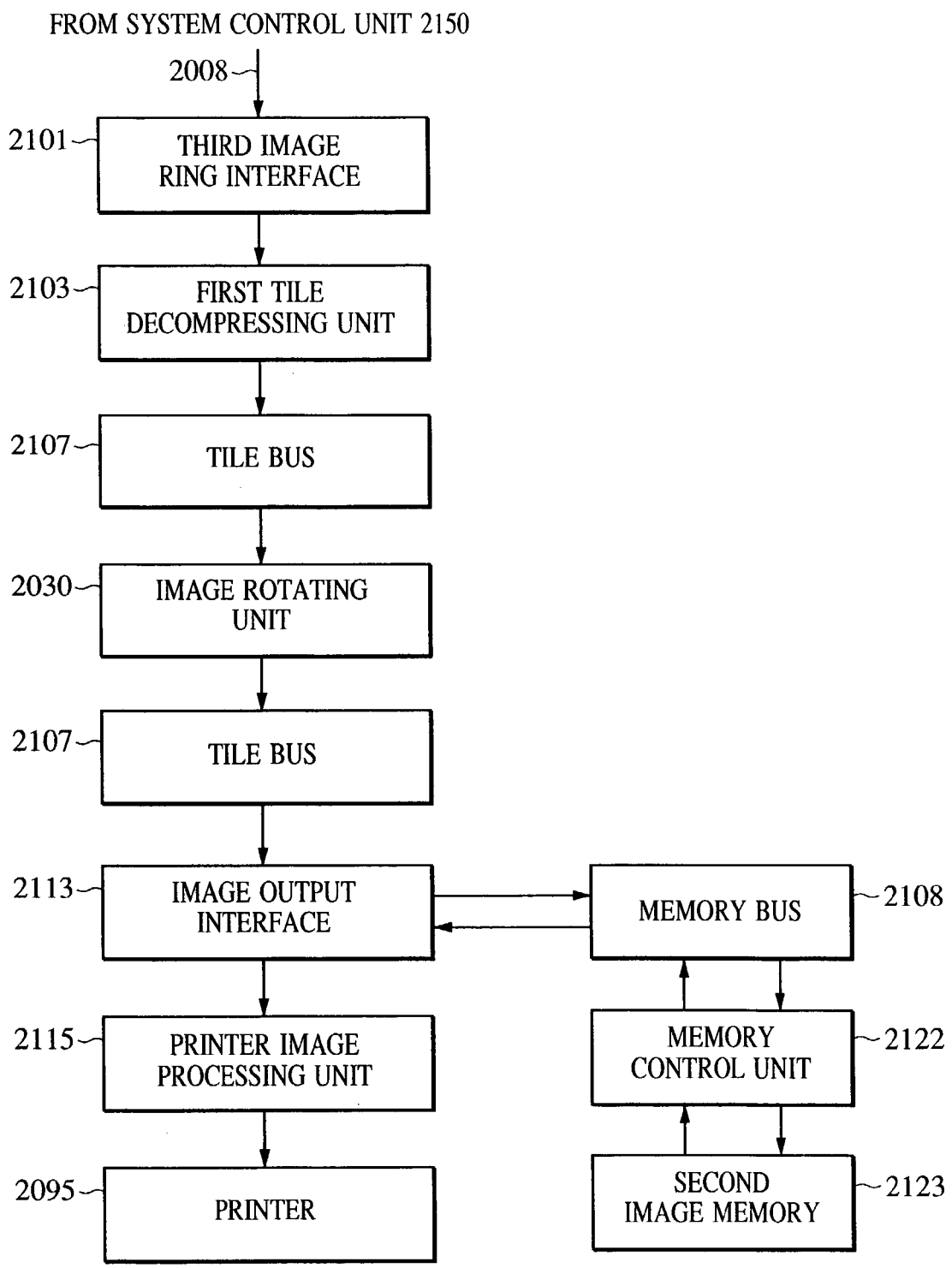
FIG. 11 is a diagram showing a data path between blocks in an image output process according to the second embodiment of the present invention.

FIG. 11 shows a data path between the blocks concerned with this operation and a procedure. An explanation will be made with reference to FIG. 11 as appropriate in addition to the block diagrams of FIGS. 2A to 2C.

First, data packets output from the system control unit 2150 are input to the third image ring interface 2101 through the image ring 2008. At this time, the data packets are output in order according to the position obtained by rotating the entire image by 90 degrees. In this instance, in the process-instruction field 3011 of each data packet, path information to output image data in the RAM 2002 through the printer 2095 is written by the system control unit 2150.

The third image ring interface 2101 selects the first tile decompressing unit 2103 and then transfers the data packets. The first tile decompressing unit 2103 is selected in accordance with the information in the process-instruction field 3011 in the foregoing packet format.

The first tile decompressing unit 2103 JPEG-decompresses a tile image of each data packet and then converts the decompressed image into uncompressed image data. Subsequently, the first tile decompressing unit 2103 requests the tile bus 2107 to make a connection to the image rotating unit 2030.

When connected to the image rotating unit 2030 through the tile bus 2107, the first tile decompressing unit 2103 transfers the data packets to the image rotating unit 2030.

The image rotating unit 2030 receives the transferred data packets and then extracts the tile images of the received data packets. The image rotating unit 2030 forms a rotated tile image, by rotating the pixel arrangement of the corresponding original tile image by 90 degrees. The image rotating unit 2030 performs the process of rotating each tile image, produces a hew data packet from the processed tile image, and then requests the tile bus 2107 to make a connection to the image output interface 2113.

When connected to the image output interface 2113 through the tile bus 2107, the image rotating unit 2030 transfers the data packets to the image output interface 2113. The image output interface 2113 receives the data packets and then transfers the data packets to the memory control unit 2122 through the memory bus 2108.

The memory control unit 2122 develops the tile images of the transferred data packets in the second image memory 2123. The development is performed in units of tiles. Each tile image is stored as raster data in the second image memory 2123. When all of the raster data of 32 lines to be output by the printer 2095 is developed, the image output interface 2113 starts to read the data in the raster order. The raster data is read out through the memory control unit 2122 and the memory bus 2108.

The image output interface 2113 reads out the data in the raster order and then transfers the data to the printer image processing unit 2115.

When receiving the raster data, the printer 2095 prints an image on the basis of the raster data.

The image input operation of storing the image tile data read by the scanner 2070 in the RAM 2002 of the system control unit 2150 has been described with reference to FIG. 7. The image output operation of printing the image tile data stored in the RAM 2002 of the system control unit 2150 using the printer 2095 has been described with reference to FIG. 11. Those operations can be combined and executed. In other words, at this time, the operation of copying an image rotated by 90 degrees can be performed using the scanner 2070 and the printer 2095.

Operation in Paper Jamming

According to the present embodiment, the operation in a case where a paper jam occurs in the printer 2095 will now be described.

In rotation printing in FIG. 11, when a paper jam occurs in the printer 2095, the printer 2095 cannot receive image data transferred after paper jamming, just as in the first embodiment. Consequently, a plurality of data packets are accumulated in the transfer path during the printing operation shown in FIG. 11. Simultaneously, a DMA started for print in the system control unit 2150 is interrupted.

According to the present embodiment, the digital multifunction machine is provided with a mechanism capable of easily controlling the recovery operation after paper jamming without a complicated control in a manner similar to the first embodiment.

The CPUs 2001 perform serial communication with the printer 2095 using one of serial ports always to monitor the state of the printer 2095. If a paper jam occurs in the printer 2095, the CPUs 2001 detect the paper jam in the printer 2095 by the serial communication.

When detecting the paper jam, the CPUs 2001 interrupt a DMA in the, system control unit 2150. In the system control unit 2150, after the interruption of the DMA for data packet transfer, the first image ring interface 2147 forms a packet indicating the interruption of the DMA for data packet transfer.

This packet is a special packet. In this packet, for example, each of the packet-ID-Y-coordinate field 3009 and the packet-ID-X-coordinate field 3010 in FIG. 3A has the maximum value, thus indicating that the DMA for data transfer is interrupted. Hereinbelow, this packet is called a "clear" packet.

The first image ring interface 2147 forms such a clear packet. After the DMA for image data transfer is interrupted, the first image ring interface 2147 transfers the clear packet, as the last packet, to the third image ring interface 2101 of the image processing unit 2149.

The third image ring interface 2101 treats the clear packet as a normal packet and then transfers the clear packet to the first tile decompressing unit 2103. After receiving the clear packet, the first tile decompressing unit 2103 interrupts all of processing being performed therein and returns to its initial state.

Subsequently, the first tile decompressing unit 2103 transfers the clear packet to the image rotating unit 2030 through the tile bus 2107.

After receiving the clear packet, the image rotating unit 2030 interrupts its internal processing in a manner similar to the first tile decompressing unit 2103 and then returns to its initial state. Subsequently, the image rotating unit 2030 transfers the clear packet to the image output interface 2113 through the tile bus 2107.

After receiving the clear packet, the image output interface 2113 clears image data which cannot be output due to the printer jam, and also clears image data developed in the second image memory 2123 up to that time. The image output interface 2113 then returns to its initial state.

As mentioned above, the clearing operation using the clear packet uses the same path as that of the process in FIG. 11. If a paper jam occurs in the printer 2095 and the image output operation is interrupted, each of the circuits in the path to the image output interface 2113 is reset to its respective initial state by the clear packet in the clearing operation.

The DMA in the system control unit 2150 is interrupted by the CPUs 2001 and is reset to its initial state. As mentioned above, each of the circuits in the path through which the image tile data is transferred in image printing is reset to its initial state by the clear packet. After the paper jam in the printer 2095 is eliminated, the operation of again outputting the image can be performed.

Figure 12:
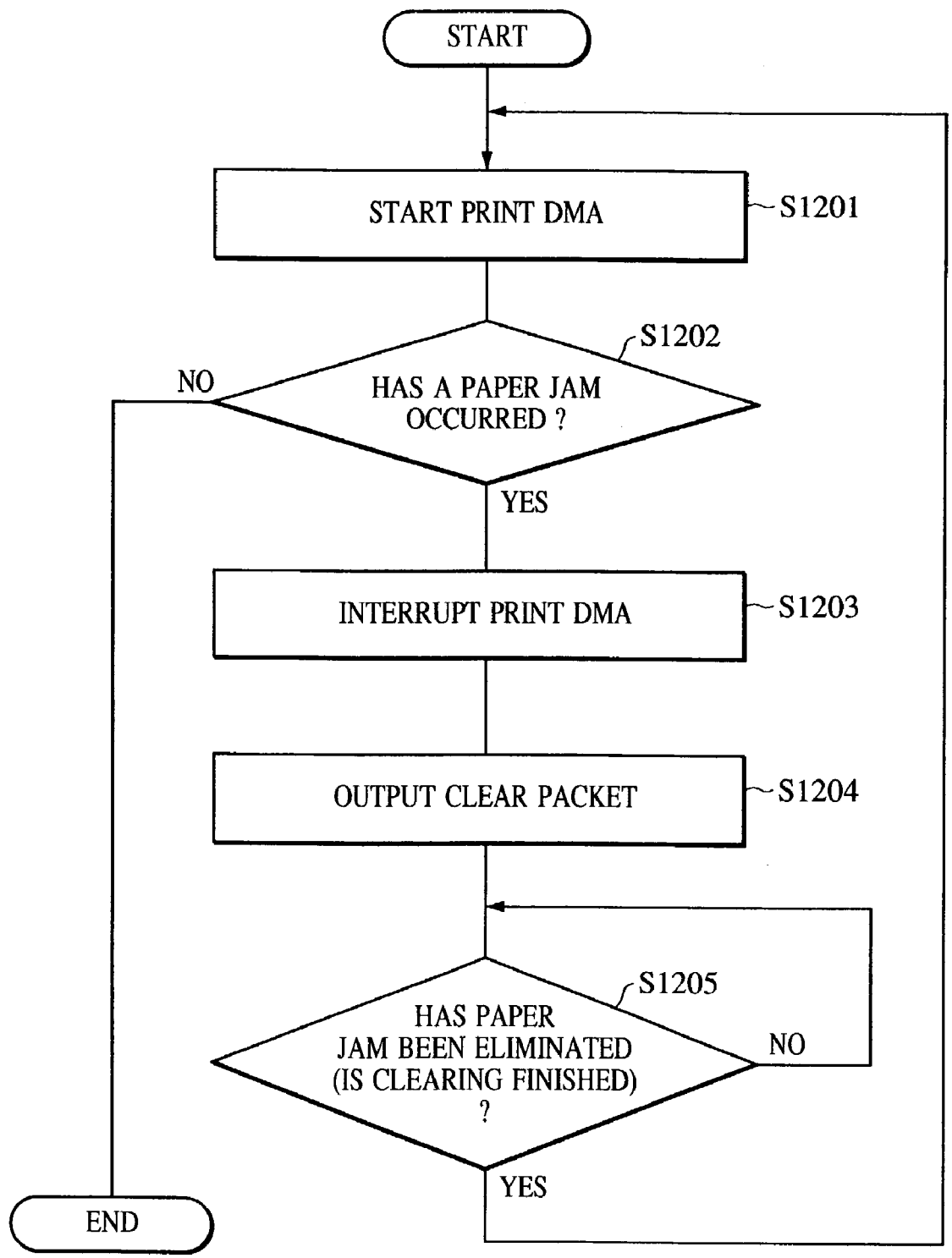
FIG. 12 is a flowchart explaining the operation when a paper jam occurs in the second embodiment of the present invention.

FIG. 12 is a flowchart showing a control for the printing operation, the control being performed by the CPUs 2001 of the system control unit 2150. An explanation will be made in accordance with the flowchart.

First, a DMA for image print is started (S1201). In this instance, data packets used in the operation of FIG. 8 are transferred from the system control unit 2150 to the image processing unit 2149.

Subsequently, whether a paper jam has occurred is determined (S1202). At this time, in the image processing unit 2149, image processing of the data packets is performed and the data is transferred to the printer 2095. If YES in step S1202, the CPUs 2001 interrupt the print DMA (S1203).

In step S1204, the first image ring interface 2147 transfers a clear packet to the image processing unit 2149. In response to the clear packet, each of the circuits in the image processing unit 2149 in the path through which tile images to be printed are transferred, is reset to its respective initial state.

In step S1205, whether the paper jam has been eliminated in the printer 2095 and the tile images has been cleared is determined. If YES, the control returns to step S1201 to start the reprinting operation.

If NO in step S1202, the image printing operation is finished in the normal fashion. According to the present embodiment, reprinting can be performed after paper jamming by the above-mentioned simple control.

As mentioned above, according to the present embodiment, if a paper jam occurs in the printer and the interruption of printout is detected, a clear packet indicating the interruption is transmitted to the image processing unit. In the image processing unit, image processing is initialized on the basis of the clear packet.

Accordingly, the transfer path to the printer and the image processing unit can be easily reset to the initial state. Thus, the operation involved in recovery from paper jamming can be easily controlled.

Third Embodiment

As described in the first embodiment, in the digital multifunction machine according to the present invention, when a plurality of operations are concurrently executed, concurrent image processing concerned with the respective operations can be executed. According to a third embodiment, the recovery operation after paper jamming during concurrent processing will now be described.

According to the present embodiment, the following image output operation will be described. In the image output operation, image data stored in the RAM 2002 is subjected to a color-converting process, the processed image data is temporarily re-stored in the RAM 2002, and the stored image data is sequentially output by the printer 2095.

The operation is composed of two processing operations for one target image data. One of the two operations is the image processing operation of performing the color-converting process on image data stored in the RAM 2002 and then temporarily re-storing the processed image data in the RAM 2002. The other operation is the image output operation of sequentially printing the image data using the printer 2095, the image data being subjected to the above image processing operation and being stored in the RAM 2002. According to the present embodiment, the digital multifunction machine can separately control the two operations and concurrently execute these operations.

Since the image output operation in the concurrent processing is the same operation as that described in the first embodiment, explanation is omitted. The image processing operation in the concurrent processing will now be described in detail.

Image Processing Operation

In the image processing operation, a color-space converting process is performed on data packets stored in the RAM 2002 of the system control unit 2150, and the processed data packets are re-stored in the RAM 2002.

Figure 13:
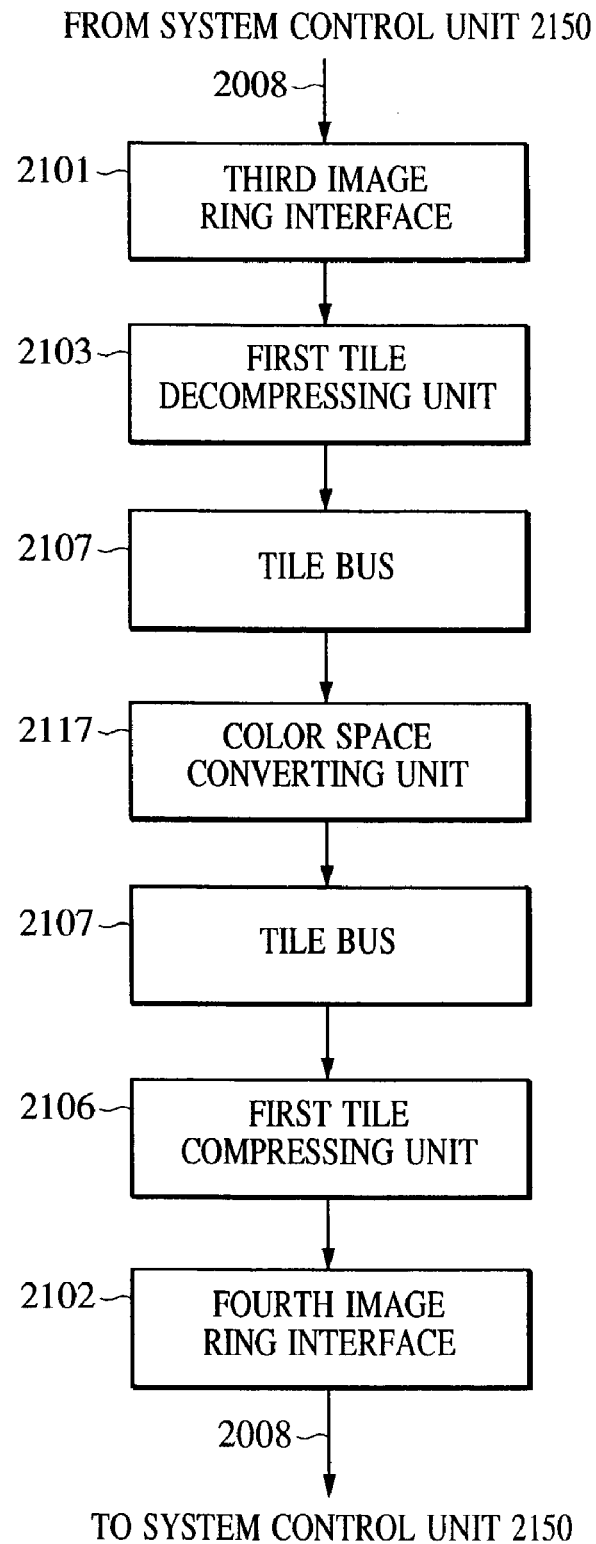
FIG. 13 is a diagram showing a data transfer path between blocks concerned with the image processing operation and a procedure according to a third embodiment of the present invention.

FIG. 13 shows a data transfer path between the blocks concerned with the image processing operation and a procedure. An explanation will be made with reference to FIG. 13 as appropriate in addition to the block diagrams of FIGS. 2A to 2C.

First, in the system control unit 2150, a DMA for data processing is started independently of the DMA for the foregoing image output operation. The DMA for the image output operation and the DMA for the color-space conversion are arbitrated in the system control unit 2150. Image data is sequentially transferred in units of packets to the image ring 2008. In this instance, in the process-instruction field 3011 of each data packet, path information to output image data in the RAM 2002 using the printer 2095 is written by the system control unit 2150.

Referring to FIG. 13, the data packets to be subjected to the color-space conversion are input from the image ring 2008 to the image processing unit 2149 through the third image ring interface 2101. The third image ring interface 2101 transfers the input data packets to the first tile decompressing unit 2103 in accordance with the information in the process-instruction field 3011.

The path up to the first tile decompressing unit 2103 overlaps the packet transfer path for the foregoing image output operation. Accordingly, two kinds of image data are transferred in the same path in the unit of packet.

The first tile decompressing unit 2103 JPEG-decompresses a tile image of each data packet. The data packets are then transferred to the color-space converting unit 2117 through the tile bus 2107. The color-space converting unit 2117 performs the color-space converting process on each tile image on the basis of set parameters. (The parameters have been set before the start of DMA transfer.) The color-space converting unit 2117 transfers the data packets, each having the converted tile image, to the first tile compressing unit 2106 through the tile bus 2107.

The first tile compressing unit 2106 JPEG-compresses the tile image of each of the transferred data packets. The JPEG-compressed data packets are transferred to the fourth image ring interface 2102. The fourth image ring interface 2102 transfers the data packets to the system control unit 2150 through the image ring 2008. The system control unit 2150 stores the transferred data packets in the RAM 2002.

Image data of the color-space converting process and image data of the image output operation described in the first embodiment are transferred in units of packets in the path up to the first tile decompressing unit 2103 in a time-sharing manner. For the entire image data, the color-space converting process is treated as a concurrent operation in the image processing.

Operation in Paper Jamming

A case where a paper jam occurs in the printer 2095 when the printing operation and the color-space converting process are being executed concurrently will now be described.

In this instance, the transfer of data packets for the image output operation is interrupted in the first tile decompressing unit 2103. The data packets are accumulated in the first tile decompressing unit 2103. The first tile decompressing unit 2103 performs the decompressing process on every packet in turn. Accordingly, when the packets are accumulated in the first tile decompressing unit 2103, the next packet cannot be input. Therefore, the transfer of packets for the color-space converting process which is performed concurrently is also interrupted.

According to the present embodiment, in order to avoid such a situation, when a paper jam has occurred in the printer 2095, operation is switched to the following operation: The image output interface 2113 receives packets, which cannot be output as an image by the printer 2095, and then discards the packets.

Figure 14:
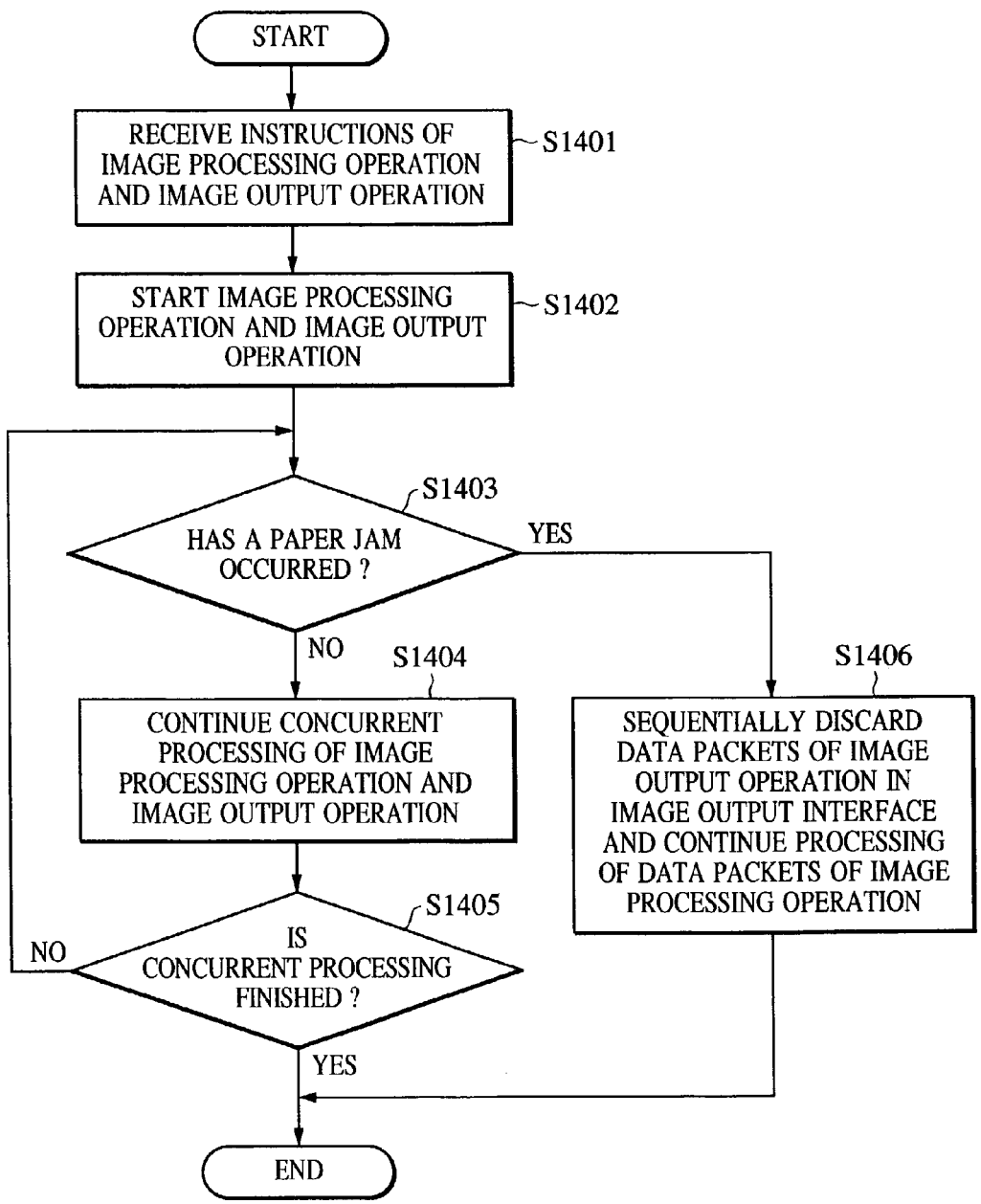
FIG. 14 is a flowchart showing the operation of an image processing unit 2149 according to the third embodiment of the present invention.

A process in the image processing unit 2149 according to the present embodiment will now be described with reference to the flowchart of FIG. 14. The processing blocks such as the image output interface 2113 and similar components in the image processing unit 2149 operate on the basis of instruction information of various packets transmitted from the system control unit 2150 to accomplish the process of the present flowchart.

First, the third image ring interface 2101 receives data packets, each including an instruction to execute the processes of FIGS. 8 and 13 (S1401). The processing blocks in the image processing unit 2149 start the image processing operation and the image output operation on the basis of the received data packets (S1402). As mentioned above, the image output operation of FIG. 8 is performed on the data packets subjected to the image processing operation of FIG. 13. Accordingly, in the actual concurrent processing, the processes in steps S1401 and S1402 regarding the image processing operation are executed earlier than the process of image output.

When the concurrent processing is started, the image output interface 2113 monitors whether a paper jam has occurred in the printer (S1403).

If there is no paper jam during the concurrent processing, data packets sequentially transferred from the system control unit 2150 are subjected to the image processing operation of FIG. 13 and the image output operation of FIG. 8 (S1404).

Whether the concurrent processing is finished is determined (S1405). The determination is made on the basis of status information transmitted from the processing blocks such as the image output interface 2113, the color-space processing unit 2117, and similar components concerned with the concurrent processing to the status processing unit 2105.

If NO in step S1405, monitoring regarding a paper jam in step S1403 and the concurrent processing in step S1404 are continuously performed. If YES in step S1405, outputting the processed image data by the printer is completed, so that the normal concurrent processing is finished.

On the other hand, if YES in step S1403, the recovery operation is started. In other words, the data packets for the image output operation are sequentially discarded in the image output interface 2115. On the other hand, the data packets for the image processing operation are processed continuously (S1406). After that, a DMA for print is restarted, to restart the image output operation. At this time, the system control unit 2150 performs the control operation similar to that of FIG. 10.

The concurrent processing is terminated during paper jamming by performing the above process. As mentioned above, in paper jamming, while the recovery operation for the image output operation is being executed, the image processing operation can be completed normally.

As mentioned above, according to the present embodiment, in the recovery operation in the concurrent processing, the image output interface, which is not concerned with the image processing operation, sequentially discards data packets concerned with the image output operation.

Thus, while the recovery operation for the image output operation is being performed, the control to continuously process data packets concerned with the image processing operation can be easily executed. Since one processing can be continued, loss of efficiency due to a paper jam can be kept to a minimum.

According to the present embodiment, in paper jamming, the image output interface discards data packets. Another processing block can discard data packets. In other words, when data packets are discarded in the processing path which does not overlap the transfer path of data packets for the image processing operation, for example, in the image memories 2123, similar advantages can be obtained.

Fourth Embodiment

According to a fourth embodiment, a case where the recovery operation is performed using a clear packet according to the second embodiment during the concurrent processing in the unit of job will now be described.

According to the present embodiment, a print job and an image transmission job are concurrently executed by control software of the digital multifunction machine. At this time, data packets concerned with the two jobs are also concurrently executed in the image processing unit 2149.

On the basis of the print job according to the present embodiment, the rotation printing operation shown in FIG. 11 described in the second embodiment is executed. On the other hand, on the basis of the image transmission job according to the present embodiment, the image processing operation in FIG. 13 and the image transmitting operation are performed on data packets stored in the RAM 2002. In the image transmitting operation according to the present embodiment, data packets re-stored in the RAM 2002 are developed into raster data for every page in the HDD 2004. The developed image data is transmitted to an external device. According to the present embodiment, the image data is JBIG ("Joint Bi-Level Image Experts' Group") compressed, the compressed data is converted into a TIFF file, and the file is transmitted as an e-mail to a personal computer or other computer. The image transmitting method is not limited to this manner. An image can be transmitted according to another format conversion and protocol, for example, using a general facsimile machine.

According to the present embodiment, the recovery operation under the following condition will now be described. It is assumed that when the two jobs are concurrently processed, a paper jam occurs in the printer 2095.

Operation in Paper Jamming

In the same case as in the second embodiment, when a paper jam occurs in rotation printing in FIG. 11, the printer 2095 cannot receive image data transferred after occurrence of the jam. Accordingly, a plurality of data packets are accumulated in the transfer path during the printing operation shown in FIG. 11. Simultaneously, a DMA started for print in the system control unit 2150 is interrupted.

According to the present embodiment, the print job and the image transmission job are processed concurrently. When a clear packet similar to that in the second embodiment is transmitted in the above situation, image data for the image transmission job is cleared in the first tile decompressing unit 2103.

According to the present embodiment, the digital multifunction machine is provided with a mechanism for clearing data packets in the image processing unit 2149 using information in the job-ID field 3008 at the header of the clear packet as identifying information to easily control the recovery operation after a paper jam.

According to the present embodiment, the CPUs 2001 perform serial communication with the printer 2095 using one of the serial ports to always monitor the state of the printer 2095. When a printer jam occurs in the printer 2095, the CPUs 2001 detect the paper jam in the printer 2095 through the serial communication.

When detecting the paper jam, the CPUs 2001 interrupt a DMA in the system control unit 2150. After the DMA for data packet transfer is interrupted, the system control unit 2150 produces a clear packet, indicating the interruption of the DMA for data packet transfer through the first image ring interface 2147.

The clear packet according to the present embodiment is similar to that of the second embodiment. In the packet, information in each of the packet-ID-Y-coordinate field 3009 and the packet-ID-X-coordinate field 3010 has the maximum value, indicating the interruption of the DMA for data packet transfer. Differently from the second embodiment, information in the job-ID field 3008 at the header is used as identifying information for a data packet to be cleared.

According to the present embodiment, data packets for the print job are desired to be cleared. The job ID of the print job is written in the job-ID field 3008.

The first image ring interface 2147 produces such a clear packet and then transfers the clear packet as the last packet to the third image ring interface 2101 of the image processing unit 2149 after the DMA for image data packet transfer is interrupted.

The third image ring interface 2101 treats the clear packet as a normal packet, and transfers the clear packet to the first tile decompressing unit 2103. A process in the first tile decompressing unit 2103 will now be described in detail with reference to a flowchart of FIG. 15. According to the present embodiment, it is assumed that the first tile decompressing unit 2103 has adequate internal CPU capability and memory capacity so that a tile decompressing process and a clear packet process can be executed concurrently.

The first tile decompressing unit 2103 receives a clear packet (S1501) and then determines whether the job ID in the job-ID field 3008 of the received clear packet matches the job ID in the job-ID field 3008 of the data packet held therein (S1502).

In step S1502, if it is determined that the held data packet is concerned with the print job and has the same job ID, the held data packet is cleared (S1503). In other words, the first tile decompressing unit 2103 interrupts all the processes which are being executed therein and returns to its initial state.

Subsequently, the first tile decompressing unit 2103 transfers the clear packet to the image rotating unit 2030 through the tile bus 2107 (S1504).

On the other hand, in step S1502, if it is determined that the held data packet is concerned with the image transmission job but the job ID is different from that of the clear packet, the first tile decompressing unit 2103 continues the process of decompressing the data packet (S1505).

In this case, the first tile decompressing unit 2103 also transfers the clear packet to the image rotating unit 2030 through the tile bus 2107 (S1504).

Thus, the clear packet process in the first tile decompressing unit 2103 is performed. In the other processing blocks (such as the color-space converting unit 2117 and similar components), the same process is executed.

When receiving the clear packet, the image rotating unit 2030 clears data packets for the print job in the same way as in the first tile decompressing-unit 2103 in accordance with the process of FIG. 15 and then returns to its initial state. Subsequently, the image rotating unit 2030 transfers the clear packet to the image output interface 2113 through the tile bus 2107.

After receiving the clear packet, the image output interface 2113 clears image data for the print job and also clears image data developed in the second image memory 2123 up to that time. After that, the image output interface 2113 returns to the initial state. As mentioned above, the clearing operation using the clear packet has the same path as that of the process of FIG. 11.

As mentioned above, only for the data packets for the print job, the circuits in the processing path are each set to their respective initial states using the job ID in the job-ID field 3008 of the clear packet. On the other hand, the data packets for the image transmission job can be continuously processed in the normal fashion.

After the paper jam in the printer 2095 has been eliminated, the outputting of the image is again performed. Thus, the concurrent processing of the print job and the image transmission job can be executed again.

During the concurrent processing, the control for the printing operation, the control being performed by the CPUs 2001 of the system control unit 2150, is similar to that of the flowchart shown in FIG. 12. In FIG. 12, in step S1204, the first image ring interface 2147 transfers a clear packet having the job ID for the print job. Responsive to the clear packet, each of the circuits in the path through which tile images to be printed are transferred, is reset to its initial state.

As mentioned above, according to the present embodiment, when the job concerned with the image output operation is interrupted during the concurrent processing, only data packets for the image output operation are cleared, using the job ID at the header as identifying information.

Consequently, while the recovery operation for the print job is being performed, the control to continue processing of data packets concerned with the image transmission job can be easily executed. Since the image transmission job can be continuously processed, loss of efficiency due to a paper jam can be kept to a minimum. Furthermore, conditions of data packets to be cleared (i.e., criteria that must be met in order for clearing to be performed) can be specified using a clear packet. Accordingly, the flexibility of the recovery operation can be increased.

The present embodiment has been described with respect to the case of deleting a print job. The kinds of jobs or the number of jobs to be processed in this fashion are not limited to those in the present embodiment (i.e., print jobs, or a single job). Therefore, the recovery operation concerned with a facsimile reception job, a PDL print job, or another job can be described in a manner similar to the present embodiment.

In the configuration according to the present embodiment, for example, if trouble occurs in the network for image transmission, the recovery operation according to the present embodiment can be used. In other words, in this case, the image transmission is interrupted, a clear packet for initializing the image processing operation of FIG. 13 is formed, and the blocks are initialized. On the other hand, the image output operation of FIG. 8 is performed continuously. Consequently, the print job can be completed normally.

According to the present embodiment, a clear packet and a data packet each have various attribute information. Accordingly, it is unnecessary to limit the application of the recovery operation according to the present embodiment to concurrent processing according to conditions such as the kinds of jobs or processing operations. In other words, a recovery operation similar to that of the present embodiment can be performed in accordance with other conditions and other attribute information. For example, during the execution of one image processing operation, if the user wants to interrupt the outputting of an image of a specified page, data packets of the corresponding page can be cleared using the page ID at the header as identifying information.

Another Embodiment

In the foregoing embodiments, the operations of the digital multifunction machine have been described as examples. The present invention is not limited to these examples. The present invention can be applied to, for example, a printer, a facsimile machine, and other image output devices. Furthermore, the present invention can be applied to an operation such as remote copying using a plurality of devices. In the operation, a digital multifunction machine performs image processing and another printer outputs an image, the printer being connected to the digital multifunction machine via a network.

Therefore, an input source of image data is not limited to an internal controller or an internal memory. A network or a communication circuit can be used. The output destination of image data is not limited to an image output device such as a printer. An external storage device, a connecting device such as a network interface or a modem, and a personal computer or other digital multifunction machine connected to the connecting device can also be used. During the image input operation, image output operation, image filing operation, or image transmitting operation concerned with the input source, if processing is interrupted in a device serving as an output destination, the present invention can be applied to an image processing unit arranged at a stage previous to the image output device so that the recovery operation can be performed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for processing an image comprising:
    an input unit adapted to input first image data;
    a storage unit adapted to store the first image data inputted by the input unit;
    a plurality of image processing devices adapted to perform plural types of image processing on second image data divided from the first image data;
    a printing unit adapted to print third image data that consists of a plurality of bodies of the second image data processed by the image processing devices;
    a transmitting unit adapted to transmit the third image data to an external apparatus;
    a transfer unit adapted to transfer the plurality of bodies of the second image data to the image processing devices, wherein there is added to said second image data first attribute information indicating whether said second image data is data for the printing unit to print or data for the transmitting unit to transmit and second attribute information indicating to which of said plurality of image processing devices said second image data should be transferred;
    a detecting unit adapted to detect an error in said printing unit; and
    a control unit adapted to control the image processing devices to clear specific bodies of second image data stored in one of the image processing portions in accordance with the detection of the error in said printing unit, wherein, information is added indicating that said specific second image data is data for the printing unit to print as said first attribute information, and
    wherein said transmitting unit transmits the third image data to the external apparatus in accordance with the cancellation of the detection of the error in a case where one of the plurality of image processing devices stores specific second image data, to which is added information indicating that said specific second image data is data for the transmitting unit to transmit as said first attribute information, when said detecting unit detects an error.

2. An apparatus according to claim 1, wherein the transfer unit transfers the second image data as a data packet including the second image data and the first attribute information and the second attribute information related to the second image data.

3. An apparatus according to claim 2, wherein the data packet includes image processing information related to image processing to be performed by the image processing devices, and wherein the image processing devices perform one of the plural types of image processings, based on the image processing information.

4. An image processing method for processing an image comprising:
    an input step of inputting first image data;
    a storing step of storing the first image data inputted at the input step to a storage unit;
    an image processing step of performing plural types of image processing on second image data divided from the first image data stored in the storage unit by using a plurality of image processing devices;
    a printing step of printing third image data that consists of a plurality of bodies of the second image data processed at the image processing step;
    a transmitting step of transmitting the third image data to an external apparatus;
    a transfer step of transferring, to one of the image processing devices, the plurality of the second image data to which is added first attribute information indicating whether said second image data is a data for the printing step to print or data for the transmitting step to transmit and second attribute information indicating to which one of said plurality of image processing devices said second image data should be transferred;
    a detecting step of detecting an error at said printing step; and
    a control step of controlling execution of the image processing step to clear specific second image data stored in one of said plurality of image processing devices in accordance with the detection of the error at said detecting step, wherein information is added indicating that said specific second image data is data for the printing unit to print as said first attribute information, and
    wherein said transmitting step transmits the third image data to the external apparatus in accordance with the cancellation of the detection of the error in a case where one of the plurality of image processing devices stores specific second image data, to which information is added indicating that said specific second image data is data for the transmitting step to transmit as said first attribute information, when said detecting step detects an error.

* * * * *

UNITED STATES PATENT AND TRADEMARK OFFICE
CERTIFICATE OF CORRECTION

PATENT NO. : 7,145,681 B2
APPLICATION NO. : 10/320383
DATED : December 5, 2006
INVENTOR(S) : Katsunori Kato It is certified that error appears in the above-identified patent and that said Letters Patent is hereby corrected as shown below:

COLUMN 10

Line 22, "5b000000=the" should read --5b00000=the--.

COLUMN 15

Line 13, "hew" should read --new--.

Signed and Sealed this

Tenth Day of April, 2007

JON W. DUDAS
*Director of the United States Patent and Trademark Office*